United States Patent [19]

Burke, Jr., deceased et al.

[11] 4,194,920

[45] Mar. 25, 1980

[54] INTRACHROMOLEUCOSPHERULOID PIGMENT COMPOSITIONS AND PROCESSES FOR PRODUCING SAME

[75] Inventors: Oliver W. Burke, Jr., deceased, late of Fort Lauderdale, Fla., by Norma Scala, administratrix; Victor T. Humphreys, Pompano Beach, Fla.

[73] Assignees: Marion Darrah; Joseph Y., co-trustees Houghton, both of Pompano Beach, Fla.

[21] Appl. No.: 12,606

[22] Filed: Feb. 15, 1979

Related U.S. Application Data

[62] Division of Ser. No. 712,253, Aug. 6, 1976, Pat. No. 4,154,621.

[51] Int. Cl.² .......................... C08K 9/02; C08K 9/04; C08K 9/10
[52] U.S. Cl. .......................... 106/308 M; 106/308 B; 106/308 G; 106/308 F; 106/308 N; 106/308 S; 106/309; 260/42.14; 260/42.15; 260/42.16; 260/42.21; 260/42.53
[58] Field of Search .......... 106/308 B, 308 M, 308 Q, 106/308 N, 308 F, 308 S; 260/42.53, 42.41, 42.14, 42.15, 42.16

[56] References Cited

U.S. PATENT DOCUMENTS

| | | | |
|---|---|---|---|
| 2,751,369 | 6/1956 | Te Grotenhuis | 260/42.53 |
| 2,786,822 | 3/1957 | Vesce | 260/42.55 |
| 3,133,893 | 5/1964 | Newman | 260/42.21 |
| 3,423,358 | 1/1969 | Burke | 260/42.43 |
| 3,502,582 | 3/1970 | Clemens | 260/42.53 |
| 3,700,690 | 10/1972 | Burke | 260/42.55 |

Primary Examiner—James Poer
Attorney, Agent, or Firm—Hall & Houghton

[57] ABSTRACT

An intrachromoleucospheruloid pigment composition and a process for producing the same; the intrachromoleucospheruloid pigment composition consisting essentially of spheruloids of essentially transparent organic polymer material, preferably cross-linked to essential insolubility in any physical solvent, having primary particles of an average size not exceeding 4 microns in diameter which have embedded therein particulate pigment composition consisting essentially of (a) organic color pigment material having primary particles of an average particle size not exceeding 0.2 micron and preferably below 0.02 micron in diameter in combination with (b) inorganic leuco pigment material consisting essentially of inorganic white and/or transparent white pigment material having a different refractive index from that of element (a) and primary particles not exceeding 0.2 micron and preferably between 0.2 and 0.1 micron in diameter. In the process for its production (a) the organic color pigment material is reduced to an average particle size of 0.2 micron or less, (b) the inorganic leuco pigment material is reduced to an average particle size of 0.2 micron or less, (c) the combined organic and inorganic leuco pigment materials (a) and (b) are then included in an emulsion polymerization of monomer material preferably comprising an effective quantity of cross-linking agent, and the polymerization is conducted to produce emulsion polymer of an average particle size not exceeding 4 microns in diameter, having embedded therein the still smaller organic color and inorganic leuco pigment particles. In the procedure it is preferable, although not essential, that the organic color pigment material and inorganic leuco pigment material be co-ground for at least a portion of the step during which the particle size reduction is effected so that the harder inorganic pigment being reduced to the prescribed size may aid in reducing the organic color pigment to a still smaller size.

Cooperative features are also disclosed.

31 Claims, 5 Drawing Figures

INTRACHROMOLEUCOSPHERULOID PIGMENT COMPOSITIONS AND PROCESSES FOR PRODUCING SAME

This is a division of application Ser. No. 712,253, filed Aug. 6, 1976, now U.S. Pat. No. 4,154,621.

BACKGROUND OF THE INVENTION

1. Field of the Invention

This invention relates to colored pigment compositions of high refractive index and hue intensity and physical properties, and aims generally to improve the same and provide novel processes for the production thereof.

2. Description of the Prior Art

In the prior art it has been well known to produce the so-called "Laked" or "Extended" pigment colors, usually by precipitation of a water soluble organic dye or pigment color base onto an inert and inherently colorless or white substrate material to either impart useful pigmentary properties to an otherwise unsuitable organic or inorganic color material or to give improved physical properties to an already useful color. Such treatments and combinations thereof included the enclosing or encapsulation of inorganic color material such as the lead chromate yellows with a siliceous envelope or encapsulation, to inhibit or reduce their toxicological properties, and also includes the laking of azo and related organic pigments on such insoluble substrate material as alumina, blanc fixe and similar compositions.

All these earlier methods simply dilute the color portion of the resulting pigment composition and essentially provide a wet or dry dispersion of the color pigment or chromogen containing part, intimately admixed with the inert or extender portion of the composition.

Such "Laked" or "Extended" colors are usually considerably duller and much weaker tinctorially than the original chromogen containing constituent, and furthermore are not infrequently themselves easily disunited into the separate components of said composition. This is especially true concerning the use of mixtures of organic color pigments where two or more are combined together to produce a shade different from either alone.

SUMMARY OF THE INVENTION

In the conventional practices above described certain combinations of colored or chromogen containing organic pigments with opaque white or transparent white, i.e. leuco pigments have been achieved either through the use of conventional laking techniques necessitating the use of the organic colors in their water soluble form, or by simple physical dilution of the organic color pigment with the colorless inorganic pigment material. Both practices while extensively used in the art today represent little or no improvement over the state of the art which has existed from almost the first use of color for decorative purposes. The present invention aims to eliminate the inherent inefficiency of these practices by first reducing both the organic color pigment and the inorganic leuco pigment, either separately or together, to below the normal limits of conventional pigmentary size, forming a composite of said organic color and inorganic leuco pigment material wherein said reduced particles of color pigment as one component and of said leuco pigment as another component are wedded to one another to form composite particles essentially comprising both components either during or subsequent to said reduction in particle size, and then by surrounding said composition particles with spheruloid bodies of essentially transparent polymer material, insoluble in the environment of intended use, and which differ in refractive index from said organic and inorganic pigments embedded therein, so that by light refraction they can enhance to the viewer the apparent size and pigmentary power of said embedded particles.

In forming the composite particles from the two components thereof, organic color pigment and inorganic leuco pigment, provision is required for the wedding of the two components. This may be effected by co-micronizing the particles so that freshly fractured areas of one component, with the electrical charges associated therewith, are brought into intimate contact with the freshly fractured areas of the other component, whereby the particles of the respective components are wedded to each other. Such wedding may also be effected by separately micronizing the organic and inorganic components in aqueous media with the aid of predominantly nonionic or weakly anionic surface active agents such as e.g. Triton X405 and Alipal CO433, containing respectively a small proportion, in the range of 1–10% by weight of the total surface active agent, of ionic surface active agents of opposite polarity, preferably anionic in the case of the organic color pigment and cationic in the case of the inorganic pigment, and then combining and co-micronizing the so formed dispersions, whereby the anionically and cationically prepared pigment particles are intimately attracted to each other and become wedded in the liquid medium to form composite particles which remain dispersed in the liquid medium with the aid of the nonionic emulsifier which is employed in sufficient amount to maintain such composite dispersion when formed. The wedding of the organic color pigment to the inorganic leuco pigment to form the composite pigment particles, may be aided when necessary or desired, depending on the particular pigments employed, by the co-grinding with the combined components of 0 to an equal weight based on the inorganic pigment, of suitable bonding agent and/or nitrogenous material selected from the classes hereinafter set forth.

In a preferred embodiment of the invention a process is provided for producing insoluble intrachromoleucospheruloid of high refractive index, which process comprises, in combination: (a) providing in liquid medium, dispersed in said medium with 0–100% by weight of the total of surface active agent set forth in clause (c) of this paragraph, a particulate composite chromoleuco pigment composition consisting essentially of organic color pigment material intimately combined with and wedded to inorganic leuco pigment material. the weight ratio of said organic color pigment material to said inorganic leuco pigment material lying in the range of 100:1 to 1:100, dry basis, said chromoleuco pigment composition being essentially insoluble in water and having primary particles of an average size less than 0.2 micron in diameter; (b) forming an aqueous emulsion polymerization system consisting essentially of (1) the composition of (a), (2) the balance, if any, of 100% of the total of surface active agent material set forth in (c), (3) monomer material selected in a ratio of said monomer material to said chromoleuco pigment composition lying in the range of 100:1 to 1:20 by weight, said monomer material consisting essentially of ethylenically unsaturated monomer material selected from the class consisting of (i) monomers polymerizable through a single ethylenically unsaturated group in the amount of 0% to 99.8% by weight of said monomer material and (ii) monomers polymerizable through a plurality of ethylenically unsaturated groups in an amount, in the range of 0.2 to 100% by weight of said monomer material, sufficient to produce polymer cross-linked to essential insolubility in any physical solvent and (4) emulsion polymerization initiator in an effective amount in the range of 0.2% to 10% by weight of the said monomer material, dispersed in an aqueous medium; (c) the ratio of the total of the surface active agent material present after (b) to said composite particulate pigment composition lying in the range of 2:1 to 1:40 by weight, and said total of surface active agent material being selected from the class of polymeric and nonpolymeric surface active agents and combinations thereof capable of effecting emulsion polymerization in the said system of the selected ethylenically unsaturated monomer material to yield polymer particles with the composite pigment composition provided in step (a) embedded therein; (d) effecting emulsion polymerization in said system at sufficient temperatures in the range of 0°–200° C. for sufficient time in the range of a few minutes to 24 hours to permit the polymerization to proceed far enough in the range of from 50 to 100% conversion by weight of said monomer material to produce as an aqueous dispersion an intrachromoleucospheruloid pigment composition consisting essentially of spheruloids of organic polymer material, cross-linked to essential insolubility in any physical solvent, having primary particles of an average size not exceeding 4 microns in diameter, and having embedded therein the still smaller size particles of said composite chromoleuco pigment composition, and (e) recovering said intrachromoleucospheruloid pigment composition.

In this embodiment the monomer material may comprise several portions added sequentially, at least one of the portions comprising cross-linking monomer as set forth and the cross-linking monomer may consist essentially of material copolymerizable with vinyl monomer, and may be wholly or partially selected from the unsaturated conjugated drying oils and their acids and derivatives thereof in the ratio to the vinyl and/or other copolymerizable monomer of 0.2:99.8 to 20:80 by weight.

The product of this preferred embodiment is particularly desirable because we have discovered that it may be modified to be soft powdering as hereinafter disclosed whereas said technique is inapplicable to non-cross-linked oil soluble polymers.

For special purposes and with less general advantage a less preferred embodiment of the invention may be employed wherein the monomer material in step (b) consists essentially of ethylenically unsaturated monomer material selected from the class consisting of monomers polymerizable through a single ethylenically unsaturated group, to produce spheruloids consisting of essentially noncross-linked organic polymer material, with limitation of the special utility of the product to environments in which its polymer portion is essentially insoluble.

We have found it to be essential to the present invention to reduce the organic color pigment to an average particle size essentially below 0.2 micron and preferably below 0.02 micron in diameter, and to reduce the inorganic leuco pigment to below 0.2 micron and preferably between 0.2 and 0.1 micron in diameter, said values being well below the optimum pigmentary ranges normally associated with said pigment materials and to effect wedding of the microground color and leucopigment to form a composite chromoleuco pigment; and that it is then possible to embed such ultra fine composite chromoleuco pigment material within transparent polymer spheruloids insoluble in the environment of intended use, preferably nonfusible at the temperature of intended use, and which differ in refractive index from that of the embedded composite pigment material, and which are of not more than 4 microns average particle size to obtain the new and useful characteristics of the present invention. The reduction in pigment particle size to such ultra fineness may be effected by micronizing in a liquid medium, e.g. in a ball mill or preferably a sand mill. The liquid medium may be an aqueous solution of dispersing agent preferably selected from those known to be suitable for effecting emulsion polymerization, or it may be a liquid body of monomer material with or without such dispersing agent and with or without a volatile organic diluent miscible with said monomer, the monomer material being suitable for polymerization in the formation of the final product.

The organic pigment color starting material may be in any conveniently available form, either as wet presscake or dry material as is commercially available; as also may be the inorganic leuco pigment material such as are described more fully in the definition of terms elsewhere in this application and in our co-pending application Ser. No. 712,252.

Also the organic color and inorganic leuco pigments may be either ground separately and combined prior to the polymerization step or may be co-ground in which case the inorganic leuco pigment may be considered as a grinding assistant in the reduction of particle size of the softer more easily ground organic color pigment material, subject to the above named requirements for effecting wedding of the micronized organic color pigment and the micronized inorganic leuco pigment to form the composite chromoleuco pigment.

The polymerization of the monomer or monomers with the composite chromoleuco pigment composition is carried out in the presence of sufficient emulsifier material to effect emulsion polymerization of the monomer material, and the nature and quantity of initiator and emulsifier, the degree of conversion of monomer to polymer, and the temperature of polymerization are selected to produce intrachromoleucospheruloid pigment having primary particles of an average size not exceeding 4 microns so that the potential color strength available may be fully developed and retained in the finished product. The amount of dispersant or surface active agent employed in aqueous micronizing of the pigment material can be as low as is consistent with reduction of the particle size to the desired level and the maintenance of its size stability.

During the emulsion polymerization functional groups may be introduced to aid in the fixation of the intrachromoleucospheruloid pigment composition to the environment of intended use by physical and/or chemical bonding, either by selection of the monomer or monomers used, or by selection of the emulsifier or emulsifiers, particularly those of a polymeric nature, which become association with the intrachromoleucospheruloid pigment particles, or may be later introduced by means of graft polymerization techniques.

Whether prepared by the preferred or less preferred embodiments the product may be recovered in step (e)

in latex form, in presscake form, or in bulk dried or in spray dried form, and may be used in vehicles in which the polymer portion of the product is insoluble, and as above noted, when the polymer portions of the product are cross-linked to essential insolubility in any physical solvent the products may be recovered in soft powdered form and/or be used in any suitable vehicle.

Thus as just described, the polymer portion of the intrachromoleucospheruloid pigment composition of applicants' invention is formed to be insoluble in the environment of intended use, and in the preferred practice of the invention is cross-linked to insolubility in all physical solvents, although in certain instances such cross-linking may be omitted.

BRIEF DESCRIPTION OF DRAWINGS

In the accompanying drawings illustrative of preferred embodiments of this invention.

GENERAL PROCEDURE

Figure 1:
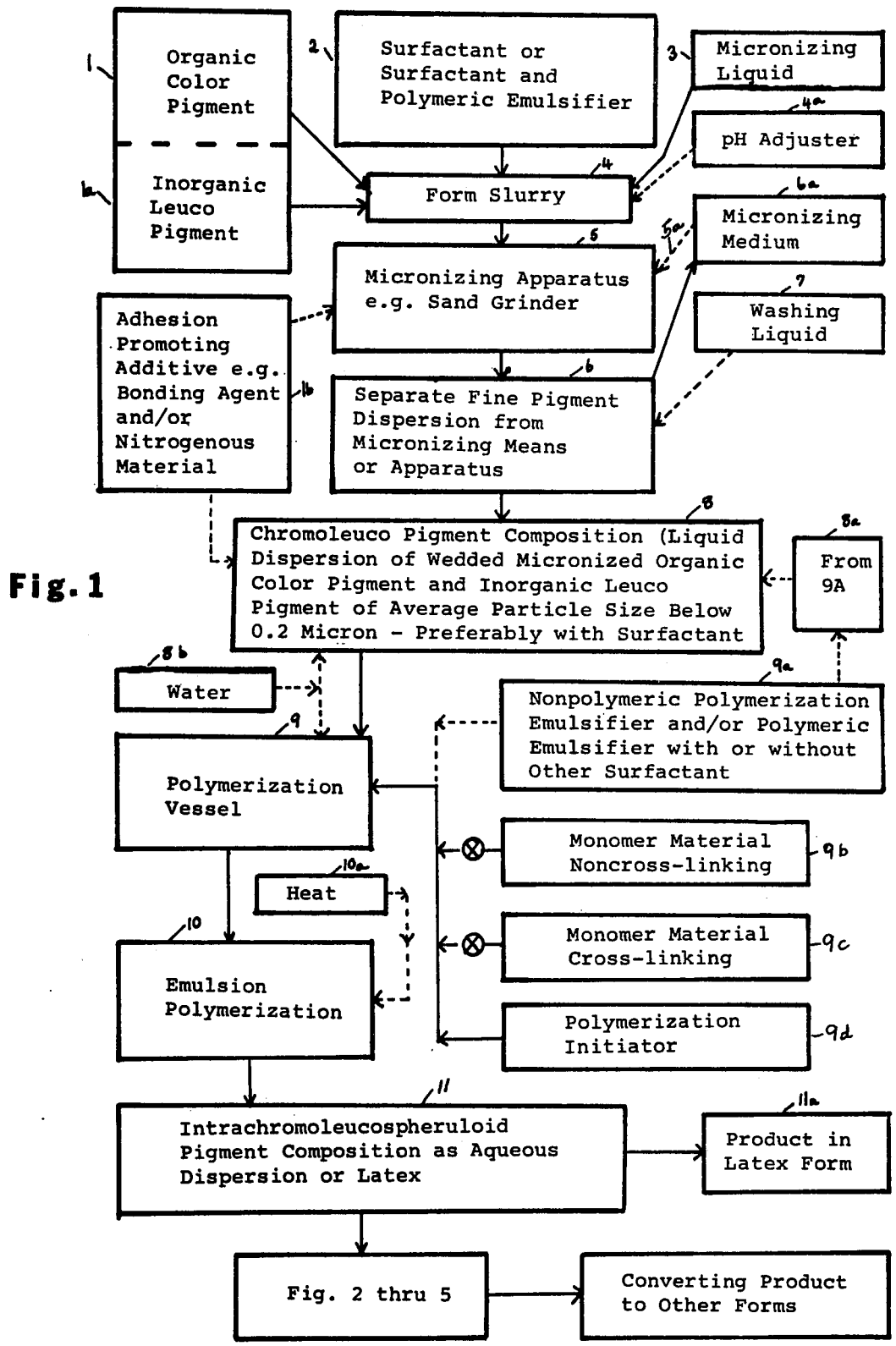
FIG. 1 is a process flow diagram of the procedure for production of intrachromoleucospheruloid pigments in latex and/or other forms.

The general procedures for preparing intrachromoleucospheruloid pigment compositions in accordance with the process of the invention are illustrated in the drawings. In these procedures (FIG. 1)(a) a pigment composition 8 is first provided consisting essentially of liquid having dispersed therein micronized organic color pigment and micronized inorganic leuco pigment, essentially insoluble in said liquid, and essentially wedded together.

As shown in the drawing and heretofore explained the dispersion of composite chromoleuco pigment composition may either be produced by co-micronizing and wedding the said organic and inorganic pigment components or they may be micronized separately and combined and wedded to form the pigment composition 8, it being readily understood to those familiar with the art that it is necessary when separate micronizing is effected that the liquid medium employed in each case be compatible with the other.

When an aqueous micronizing liquid 3 is employed, it comprises surface active agent material 2 which stabilizes the dispersion of the micronized pigment material in said aqueous phase, in which the pigment is so finely divided as to have an average particle size below the usual pigmentary range. As shown in FIG. 1 the micronizing may be accomplished by charging to a micronizing apparatus 5, e.g. a ball mill or preferably a sand grinder, a slurry 4, of pigment material e.g. 1, organic color pigment, 1a, inorganic leuco pigment or a combination of 1 and 1a, with sufficient water 3 to facilitate the grinding and sufficient surface active agent material 2 to stabilize the dispersion to be produced. The charge of slurry 4 is then micronized as at 5 until the pigment particles are so finely divided that the average particulate entities thereof have an average particle size of less than 0.2 micron and in the case of the organic color pigment preferably of less than 0.02 micron and then separated as at 6 from the micronizing medium 6a, e.g. sand, to supply the chromoleuco composite pigment dispersion 8. In the aqueous micronizing procedure the ratio of pigment material to water to obtain efficient grinding should be in the range of 20:80 to 30:70 and the ratio of surface active agent material to water should be in the range of 5:95 to 20:80 parts by weight or even more and to effect the wedding of the pigments, may conclude with co-micronizing thereof. Applicable ratios of surface active agent material are subject to variation depending on the particular organic and/or inorganic leuco pigment material being micronized and the particular surface active agent material employed, are not highly critical and may be optimized empirically.

The composite chromoleuco pigment composition 8 with or without added surface active agent material 8a (which may be provided if the dispersion is to be stored for a substantial time before further processing) is then ready for the next step of the procedure.

When a nonaqueous micronizing liquid 3 is employed the present invention contemplates use as such liquid of a part or all of the ethylenically unsaturated monomer material to be employed in the polymerization step 10 with or without added volatile organic solvent miscible with the monomer material and preferably removable prior to the polymerization step. In such instances the amount of surface active agent material 2 employed in the micronizing step 5 can be reduced to zero or a part or all of the surface active agent or emulsifier to be used in the emulsion polymerization may be present during the micronizing step or steps above described. Generally the same consideration as to proportions of liquids to solids and empirical practices apply whether the micronizing liquid 3 be aqueous or nonaqueous. Obviously, when micronizing in flammable material the temperature and the conditions of grinding, such as maintenance of an inert atmosphere and the use of explosion-proof electrical equipment must be controlled in the interests of safety. When it is desirable to employ a wash liquid 7 for removing fine pigment dispersion from the micronizing medium, it is desirable to use a washing liquid which is employed as a component in the polymerization 10. When such a nonaqueous micronizing system is employed the micronized chromoleuco pigment composition from 6 is then emulsified in 8 with the aid of water 8b and surface active agent material 8a capable of supporting emulsion polymerization to form a pigment composition 8 containing therein sufficient composite chromoleuco pigment material, surface active agent material, monomer material and water to form an emulsion polymerization composition which is charged to the polymerization vessel 9. Should it be more convenient the necessary water 8b and emulsifier material 8a, may be charged directly to the polymerization vessel 9 and the nonaqueous pigment composition 8 added thereafter. Preferably in either of the above procedures the degree of micronization is monitored during step 5 by microscopic examination of samples of the micronized slurry to determine when the necessary pigment particle size has been obtained, at which time the pigment composition 8 is separated from the micronizing medium 6a e.g. sand, which may be recycled as at 5a to the micronizing apparatus employed to carry out the micronizing step 5.

During this micronizing step 5 there may also be incorporated if desired, additional adhesion or bonding agent components 1b, such as water soluble alkali metal silicates, aminoplasts, phenoplasts, and their components, water soluble and/or dispersible polymer and the like and/or nitrogenous materials, and/or monomer material should it be desired to intimately admix the same during the micronizing step to ensure formation of the composite chromoleuco pigment particles. Or, if this co-grinding is unnecessary said bonding agent material may be incorporated into the organic/inorganic pigment composition 8 as indicated by the dotted arrow.

In the next step the finely divided composite chromoleuco pigment entities in said composition 8 are converted into intrachromoleucospheruloid pigment by forming about them bodies of essentially transparent polymer of not over 4 microns in particle size diameter. To accomplish this step the composite chromoleuco pigment composition 8 is charged to a polymerization vessel 9 with sufficient surface active agent material 9a (additional to that supplied at 2 and/or 8a), if necessary, to provide a total content of surface active agent material appropriate for the emulsion polymerization of monomer material, e.g. 9b, with the aid of an emulsion polymerization initiator 9d, which materials are also charged to the polymerization vessel. Sufficient monomer material is charged so that when polymerized to the desired conversion, usually 100% conversion, the ratio of the composite chromoleuco pigment content to the polymer content of the intrachromoleucospheruloid pigment is in the range of 1:100 to 20:1 (Preferably 1:10 to 4:10). As indicated at 10a heat may be supplied to expedite the polymerization 10, as is well known to those skilled in the emulsion polymerization art.

By such procedures the conversion step (b), produces from the micronized composite chromoleuco pigment material and monomer material supplied, an essentially stable aqueous dispersion, i.e. latex, of intrachromoleucospheruloid pigment composition 11, in which the coloration of the organic color pigment and covering power of the inorganic leuco pigment, in combination in any vehicle of lesser refractive index than the polymer of the spheruloids, are synergistically enhanced by refraction and reflection within the spheruloids and at the interfaces between the spheruloids and vehicle. This latex form product may be utilized as such as in 11a for the coloration of water based systems such as latex paints, printing inks, textile printing formulations, coloration of paper in the beater and similar fields of use, or may be further processed as shown in FIGS. 2 through 6 to produce intrachromoleucospheruloid pigment in other forms.

Figures 2, 3, 4, 5:
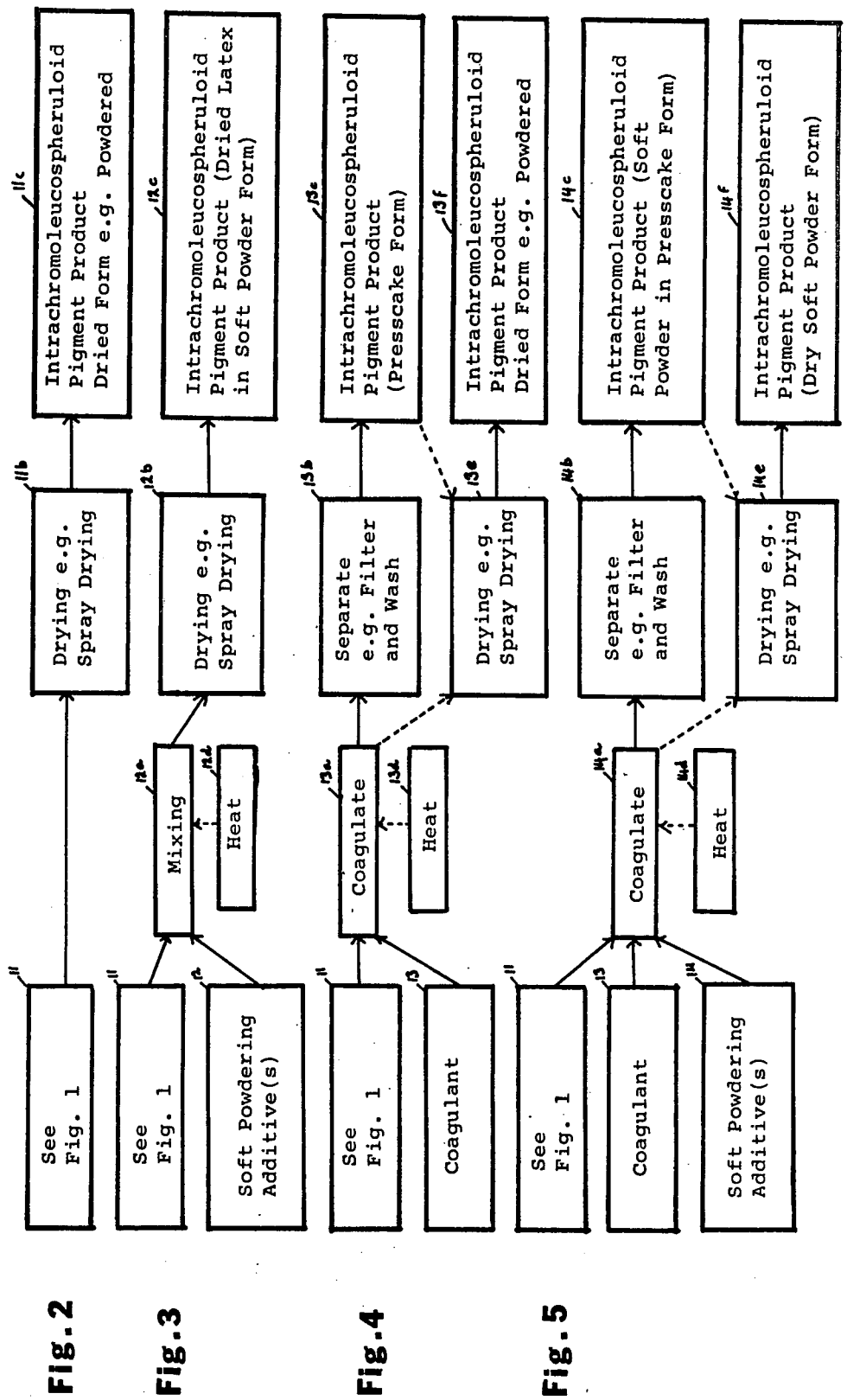
FIGS. 2, 3, 4, and 5 are detail flow diagrams of processes for converting the aqueous dispersion of intrachromoleucospheruloid pigment composition produced in FIG. 1 into other forms such as wet presscake, dry powder or soft powder form.

As shown in FIG. 2 the intrachromoleucospheruloid pigment dispersion 11 may be converted to a dry powdered product 11c by drying and pulverizing, preferably by spray drying, as shown at 11b. When spray drying is employed the dispersion being dried may be reduced to a very fine spray in order to obtain a finely divided spray dried product without additional processing.

Alternately the need for such a spray drying procedure may be reduced as shown in FIG. 3 by intimately mixing with the preferred cross-linked insoluble intrachromoleucospheruloid pigment dispersion 11, as at 12a, soft powdering additive(s) 12, with or without the aid of heat 12d, and drying this mixture, which will produce the cross-linked intrachromoleucospheruloid pigment in dried soft powder form 12c, requiring little or no mechanical attrition to constitute a useful powdered product. These dried intrachromoleucospheruloid pigment products 11c and 12c are more readily shipped and stored than the intrachromoleucospheruloid pigment in latex or aqueously dispersed form and may be employed for the same purposes as above set forth in connection with intrachromoleucospheruloid pigment latex 11a.

As shown in FIG. 4 instead of drying the intrachromoleucospheruloid pigment dispersion directly as in FIGS. 2 and 3, the intrachromoleucospheruloid pigment latex or dispersion may be coagulated as at 13a with the aid of a coagulant 13, with or without the aid of heat 13d, and the coagulum of intrachromoleucospheruloid pigment may then be separated from the serum as at 13b e.g. by centrifuging or filtering and washing, to produce the intrachromoleucospheruloid pigment in wet presscake form 13c. Such wet presscake form has advantages for certain uses where a product is required that is substantially free of surface active agent material and excess water; e.g. as in the flushed color industry, and may also be used for the same purposes as the intrachromoleucospheruloid pigment latex or dispersion 11a, or the dried intrachromoleucospheruloid pigment latex powders 11c and 12c having surface active agent material therein. The coagulated intrachromoleucospheruloid pigment material 13a, which may have its characteristics modified by the coagulant and/or any other modifying agent material which may be present therein, can itself be dried as indicated by the dotted arrow leading from 13a to 13e in FIG. 4, or where a dry intrachromoleucospheruloid pigment essentially free of surface active agent material and/or coagulant material residues is preferred, the intrachromoleucospheruloid pigment presscake 13c may be dried as indicated by the dotted arrow leading from 13c to 13e for producing such form of product 13f.

The procedure of FIG. 4 may be modified as shown in FIG. 5, by adding to the intrachromoleucospheruloid pigment, latex or dispersion 11 when cross-linked to physical insolubility, not only coagulant material 13, but also soft powdering additive(s) 14, which may be introduced either before or after the coagulation is effected at 14a (with or without the aid of heat 14d). The so modified coagulated intrachromoleucospheruloid pigment dispersion may then be treated in the same manner as described in connection with items 13b, 13c, 13e and 13f as indicated by the respectively corresponding items 14b, 14c, 14e and 14f in FIG. 5 and the modified products 14c and 14f include the soft powder advantages described in connection with FIG. 3.

Such dry insoluble intrachromoleucospheruloid pigments are especially suitable for incorporation into nonaqueous systems, especially oil based paint and printing inks and the opacifying and hue modification of thermoplastic compounds.

For clarity in the following more detailed description and exemplification of the invention certain terms will be employed, the meaning of which we here set forth:

(1) Organic Color Pigments

The term "organic color pigments" as used herein designates the organic pigmentary materials which are colored as distinguished from water white or opaque white inorganic materials.

The invention may utilize any such organic color pigments and is not limited to the use of any particular organic color pigment. As illustrative but not restrictive of those that may be used to form intrachromoleucospheruloid pigments of this invention are those organic color pigments set out in the "Chemistry of Synthetic Dyes" by K. Venkataraman, Vol. V, especially Section 6, pages 314–474, Academic Press, New York, N. Y., (1971), herein incorporated by reference, which include pigments of the well known azo class exemplified by the acetoacetarylide azo, the pyrazolone azo, the α-naphthol azo, the 2-hydroxy-3-naphthoic acid azo, the 2-hydroxy-3-naphtharylide azo and the naphtholsulfonic acid azo pigments; the triphenylmethane pigments and related pigmentary compounds; the phthalocyanine pigments; the anthraquinone, indigoid and related pigments; the quinacridone pigments; the dioxazine pigments; the azamethine pigments; the fluororubine pigments; the naphthindolizinedione pigments; and other miscellaneous organic pigmentary compositions; and those set out in "The Chemistry of Synthetic Dyes and Pigments" by Herbert A. Lubs, Reinhold, New York (1955), herein incorporated by reference, and in "The Color Index", 3rd Edition (1973) published jointly by the "British Society of Dyers and Colourists" and the "American Association of Textile Chemists and Colorists", also herein incorporated by reference. Typical representatives of these organic color pigments are set forth in the examples herein by way of illustration.

(2) Inorganic Pigments

The terms "inorganic pigments" and "inorganic pigment material" or "leucopigment material" as used herein designates the inorganic pigmentary materials both natural and manufactured in origin which are usually described as water white or "opaque white pigments". It also includes for the purposes herein the semiopaque white pigments or "transparent white pigments" or "extender or filler pigments".

The invention may utilize any such inorganic pigments and is not limited to the use of any particular inorganic pigment or pigments. As illustrative but not restrictive of those that may be used to form intrachromoleucospheruloid pigments of this invention are the opaque white and transparent white pigments such as are referred to in the Chemical Rubber Handbook 55th Edition 1974–1975; herein incorporated by reference; in the 3rd Edition (1973) of "The Color Index". Volume 3 published jointly by the "British Society of Dyers and Colourists" and the "American Association of Textile Chemists and Colorists", herein incorporated by reference; and in Volume 1 of "The Pigment Handbook", published by John Wiley and Sons 1973, edited by Temple C. Patton, also herein incorporated by reference.

The most useful of the inorganic pigments for the purpose of this invention include, but are not limited to the siliceous pigments including the natural silica pigments, the precipitated silica pigments, the pyrogenic silica pigments, the alkaline-earth silicate pigments, the aluminum silicate pigments, the zinc silicate pigments, the zirconium silicate pigments; the titanium dioxide pigments and pigment compositions; alkaline-earth carbonate and sulfate pigments, the alumina and hydrated aluminum oxide pigments, zirconium oxide pigments and combinations of any two or more of such pigments. Typical representatives of these inorganic pigments are set forth in the examples by way of illustration.

(3) Surface Active Agent Material

Among the dispersing and/or emulsifying agents available for use as surface active agents herein we have found that the essential criterion for such agent is that it, or it in combination with one or more additional dispersants and/or emulsifiers which may be used, should be capable of supporting emulsion polymerization. Having regard to this criterion surface active agents or as they are more generally classified "surfactants" (which encompasses both grinding, wetting and emulsifying agents) may be either anionic, nonionic, cationic or amphoteric; of either singular molecular structure or polymeric nature; it being understood that when two or more of such agents are employed together they must be compatible with each other, except when minor proportions of surfactants of opposite polarity are being used as wedding agent as above described. Thus in the emulsion polymerization steps nonpolymeric or polymeric anionic surfactants may be combined with each other and/or with nonionic and/or amphoteric surfactants, polymeric or nonpolymeric; and nonpolymeric or polymeric cationic surfactants may be combined with each other or with nonionic and/or amphoteric surfactants; and amphoteric and/or nonionic surfactants may be combined with each other. Thus it is possible to use a very wide range of commercially available surface active agents for achieving the degrees of grinding, the emulsion polymerization, and the production of intrachromoleucospheruloid pigments as latices suitable for particular uses, as hereinafter exemplified, comprehensive listings of which are set out in the treatises "Detergents and Emulsifiers 1974 Annual" by John W. McCutcheon, published by John W. McCutcheon, Inc., Morristown, New Jersey, especially under the headings of Emulsifiers Suitable for Emulsion Polymerization, etc., and "Surface Active Agents and Detergents" by Anthony N. Schwartz et al, Interscience Publishers, Inc., New York (1958), Vol. 2, pages 153–172, each of which is herein incorporated by reference.

Among the commercially available surfactants may be mentioned the *anionic* surfactants, e.g. carboxylic acids and their derivatives, sulfonic esters, alkanesulfonates, alkylaryl sulfonates and phosphate esters; the *effectively nonionic* surfactants e.g. Alipal CO 433, the *nonionic* surfactants e.g. polyethenoxy ethers of alkylphenols, polyethenoxy ethers of alcohols and mercaptans, difunctional and poly-functional polyethenoxy esters, miscellaneous polyethenoxy esters, polyethenoxy compounds with amide and miscellaneous linkages and various polyhydroxy compounds; the *cationic* surfactants, e.g. the straight chain alkyl ammonium compounds, the cyclic alkylammonium compounds, the olefinderived compounds, and the quaternary compounds derived from the same; the *amphoteric* surfactants e.g. those derived from betaines and phenolic solutions; and the *polymeric* surface active agents set out in the said McCutcheon and Schwartz et al treatises. Typical examples of representative surfactants of these classes and combinations thereof are set forth in the Examples hereinafter, it being understood that said Examples are but illustrative and not restrictive of the invention, e.g. the recently available fluorocarbon surfactants have also been found effective, especially when used in small proportions with other less expensive surfactants, for both the micronizing and the emulsion polymerization steps. Typical of these fluorocarbon surfactants are the "Zonyl" trade-marked fluorocarbon surfactants of the DuPont Company, such as Zonyl A or P (anionic), Zonyl C (cationic), Zonyl N (nonionic), and Zonyl B (amphoteric).

(4) Micronizing

The term "*micronizing*" as used herein connotes the physical reduction in particle size in a liquid medium of the organic and inorganic pigment materials by means of an appropriate grinding system, e.g. a ball mill or a sand mill, to the particle size desired in the step concerned, with the aid of a surface active system if needed to assist the grinding and inhibit agglomeration of the micronized particles into aggregate particles of larger size. Both ball mills and sand mills or sand grinders are well known to the pigment art and commercially available. The balls in the case of ball mill, or the sand or like grinding material in the case of the sand mill, are herein termed micronizing media.

(5) Monomer Materials

The monomer materials which may be used in practicing the present invention are the monomer compounds containing and emulsion polymerizable through one or more ethylenically unsaturated $>C=C<$ groups to form homo-polymers, copolymers or grafted polymers to constitute the essentially transparent particles formed about the composite pigment entities herein.

Such compounds containing and polymerizable through a single one of such groups produce linear polymers unless copolymerized with cross-linking monomer, i.e. monomer containing a plurality of such groups, which category for the purpose of this invention, includes not only polyvinyl, polyalkyl and vinylallyl monomers but also the drying oil substances emulsion copolymerizable with other ethylenically unsaturated compounds.

The polymer bodies surrounding the pigment particles in accordance with this invention preferably are cross-linked to insolubility in all physical solvents, but may be insoluble only in the intended environment of use. With these criteria for guidance, the monomer materials and emulsion polymerization procedures employable may be selected by one skilled in the art from any of those available. The fact of cross-linking to insolubility in all physical solvents enhances the utility in that it also renders the cross-linked particles infusible thus making the cross-linked material usable in any type of thermoplastic material.

Among the mono-ethylenically unsaturated monomers available for preparation of the improved pigment composition are mono-vinyl aromatic compounds such as styrene, the methyl styrenes, the ethyl styrenes, the dimethyl styrenes, the diethyl styrenes, the isopropyl styrenes and mixed alkyl styrenes; nuclear substituted vinyl aryl alkyl, aralkyl, cycloalkyl, alkoxy, aryloxy, chloro, fluoro, chloromethyl, fluoromethyl and trifluoromethyl nuclear derivatives; halogenated derivatives of these various aromatic vinyl compounds such as the mono and dichloro styrenes; the alkyl substituted mono and dichloro styrenes; the vinyl naphthalenes, e.g. methyl vinyl naphthalene and their halogenated derivatives; the vinyl aryl acids and vinyl alkyl acids such as acrylic acid and the alpha-alkyl substituted acrylic acids such as methacrylic acid, and esters of such acids as glycidyl, methyl, ethyl, propyl, butyl, isobutyl and other esters of aliphatic alcohols; the amides of acrylic and methacrylic acid and derivatives thereof such as the methacrylamides, acrylamides, N-methylacrylamides, N-N-diethylacrylamide, N-ethylmethacrylamide, N-N-dimethylmethacrylamide, etc.; the nitriles such as acrylonitrile, methacrylonitrile, ethylacrylonitrile, chloroacrylonitrile and other nitriles; the alkyl esters of alpha-ethylenic aliphatic dicarboxylic acids such as diethyl fumarate and diethyl-chloro maleate; the unsaturated ketones, methyl vinyl ketone and methyl isopropenyl ketone; the vinyl pyridines; the vinyl quinolines; vinyl furans; vinyl carbazoles, the esters of vinyl alcohols such as vinyl acetate; acetylamino substituted acrylic and methacrylic acids, and their esters, methyl, ethyl, propyl- and the like such as α-acetaminoacrylate and the α-n-butyraminoacrylates, etc.; the ethers of olefinic alcohols especially the ethers of vinyl and allyl type alcohols such as vinyl ethyl ether, vinyl butyl ether, vinyl tolyl ether, divinyl ether, methyl isopropanyl ether, methallyl ethyl ether; the unsaturated aldehydes such as acrolein and methacrolein and the like; the allyl and vinyl nitrogen ring compounds such as triallylcyanurate; copolymerizable alkenyl chlorides including methallyl chloride, allyl chloride, vinyl trichloride, vinylidene chloride, 1-chloro-1-fluoro ethylene and 4-chlorobutene-1; and the vinylidines.

Among the cross-linking or polyethylenically unsaturated monomers which may be used alone or in combination with other emulsion polymerizable ethylenically unsaturated compounds, are the polyvinyl, polyallyl and vinylallyl compounds such as polyvinyl aromatic compounds, for example divinylbenzene, divinyltoluene, divinylxyline, divinylethylbenzene, trivinylbenzene, divinylnaphthalene, divinylmethylnaphthalenes; the vinyl esters, allyl esters and vinyl allyl esters of carboxylic and polycarboxylic acids including polymerizable ester monomers such as diallyl maleate, vinylcrotonate, allyl methacrylate, allyl acrylate, ethylene glycol dimethacrylate, divinylsuccinate, divinyladipate, vinylacrylate, vinylmethacrylate.

The copolymerizable "drying oils" which may be used as cross-linking agents include the polyunsaturated fish oils which oils are capable of forming films by oxidation on exposure to air and further include these oils in their raw state, in bodied form and/or otherwise modified, as by air blowing. The term "drying oil substances" includes (1) the drying oils, especially those containing conjugated unsaturation e.g., tung oil, oiticica oil, isano oil, conjugated linseed oil, conjugated soya bean oils, fish oil, etc., (2) the air blown or bodied drying oils, whether from conjugated or nonconjugated drying oils and whether bodied by heat and/or catalytically, (3) the fatty acids including their dimers, trimers and tetramers derived from such drying or modified drying oils.

In preparing modified improved intrachromoleucospheruloid pigment compositions by graft polymerization techniques, active sites may be provided on the spheruloids by grafting with butadiene, isoprene, piperyline, methyl pentadiene and/or other hydrocarbon dienes and also the polar dienes such as chloroprene and cyanobutadiene.

(6) Polymerization Initiator

Examples of suitable *emulsion polymerization catalysts or initiators* that may be used include water soluble catalysts such as the perborates, persulfates and perchlorates of potassium sodium and ammonia; which may be used with or without small amounts of heavy metal salts such as those of iron, cobalt, etc.; with or without a reducing agent such as sodium bisulfite or metabisulfite, or the catalyst may be an inorganic peroxide such as barium peroxide, sodium peroxide, hydrogen peroxide; and aliphatic acyl peroxide such as acetyl peroxide, lauryl peroxide, stearyl peroxide; an aromatic acyl peroxide such as benzoyl peroxide, or phthaloyl peroxide; a mixed peroxide such as acetyl benzoyl peroxide, acetyl stearyl peroxide; organic aliphatic and aromatic azo compounds such as azobisisobutyronitrile and certain azo dye structures; or it may be a hydroperoxide such as cumene hydroperoxide or diisopropylbenzene hydroperoxide which is often used with a reducing agent such as tetraethylene pentamine, and ferrous sulfate as a source of iron with sodium or potassium pyrophosphate to complex the iron.

Heat or radiation may also serve to initiate or facilitate emulsion polymerization.

A mercaptan such as dodecylmercaptan may sometimes be used in small amounts as a polymerization initiator, whereas in larger amounts it serves as a polymerization modifier; or aluminum salts such as the halides; organic and inorganic acids; metal compounds of the unsaturated acids such as cobalt and manganese resinates, linoleates and maleates may be used. The catalyst system chosen is only important insofar as it affects the rate of the polymerization reaction, always taking into account that the system chosen must not react unfavorably with the pigment or pigments being used.

(7) pH Adjustment

By pH adjustment is meant the addition of either acid or base to adjust the pH for micronizing and/or polymerization to within the desired ranges for the purpose in question, e.g. for efficiency and/or compatibility with the pigmentary, monomeric, and/or surfactant materials being used. Preferred additives are the organic acids such as acetic, formic, or hydroxyacetic to lower the pH, and ammonium hydroxide to raise the pH. Inorganic acids and/or bases may be used provided they do not form objectionable amounts of salts which would interfere with the process or attack the equipment being used.

(8) Polymerization Vessel

By polymerization vessel is meant any suitable vessel equipped with the necessary mechanical stirrer, temperature controls, and apertures for addition of reactants prior and during the polymerization step, constructed of suitable materials such as stainless steel or preferably glass lined to avoid contamination of the polymerization ingredients.

(9) Emulsion Polymerization

By the term emulsion polymerization is meant the polymerization in aqueous medium of polymerizable ethylenically unsaturated monomer or monomers, linear or cross-linking in nature, in such a manner that the polymer formed is a latex.

(10) Chromoleuco or Chromoleuco Composites

The term "chromoleuco" or "chromoleuco composite" as used herein connotes the composite particles from the two components thereof, organic color pigment material and inorganic leuco pigment material wedded together. This wedding may be effected by co-micronizing the particles so that freshly fractured areas of one component, with the electrical charges associated therewith, are brought into intimate contact with the freshly fractured areas of the other component, whereby the particles of the respective components are wedded to each other. Such wedding may also be effected by separately micronizing the organic and inorganic components in aqueous media with the aid of predominantly nonionic or weakly anionic surface active agents such as, e.g. Triton X405 and Alipal CO 433, containing respectively a small proportion, in the range of 1–10% by weight of the total surface active agent, of ionic surface active agents of opposite polarity, preferably cationic in the case of the inorganic pigment, and then combining and co-micronizing the so formed dispersions, whereby the anionically and cationically prepared pigment particles are intimately attracted to each other and become wedded in the liquid medium to form composite particles which remain dispersed in the liquid medium with the aid of the nonionic emulsifier which is employed in sufficient amount to maintain such composite dispersion when formed. The wedding of the organic color pigment to the inorganic leuco pigment to form the composite pigment particles, may be aided when necessary or desired, depending on the particular pigments employed, by the co-grinding with the combined components of 0 to an equal weight based on the inorganic pigment, of suitable bonding agent and/or nitrogenous material selected from the classes hereinafter set forth.

(11) INTRACHROMOLEUCOSPHERULOID PIGMENT

The term "intrachromoleucospheruloid pigment" as used herin designates spheruloids of essentially transparent polymer material, preferably cross-linked to essential insolubility in all physical solvents, and of an average particle size of not more than 4 microns, having embedded therein still smaller particles of organic color pigment and inorganic pigment material. The transparent spheruloids of preferably cross-linked polymer, in any medium of lesser refractive index in which they are insoluble, preserve the attained particle size of the embedded pigment material and enhance the hue and apparent strength and opacity of the same, thus providing a new and useful color pigment composition.

(12) Latex

By the term latex is meant the aqueous dispersion of the intrachromoleucospheruloid pigment composition in which the intrachromoleucospheruloid pigment particles are so small that they are essentially non-settling.

(13) Soft Powdering Agent(s)

The term soft powdering agent(s) or additive(s) as used herein connotes materials selected from the class consisting of aliphatic, cycloaliphatic and aromatic hydrocarbon and their alcohols having boiling points between 90° C. and 200° C. preferably the predominantly aliphatic hydrocarbon solvents of this class such as solvent naphtha, and Stoddard solvent. Naphtha solvent, or solvent naphtha, is a mixture of low boiling hydrocarbons having a boiling point range of 90°–165° C. obtained in the distillation of coal tar, petroleum or shale oil, and may contain appreciable portions of benzene or its homologues. Stoddard solvent is a petroleum distillate with minimum flash point of 100° F., 90% distillable at 375° F. with an end point of 410° F.

In accordance with this invention, said hydrocarbon materials are preferably applied in conjunction with an oil-soluble surface active agent. The oil-soluble surface active agent is selected from that class of materials extensively defined by Schwartz, Perry and Berch in their book Surface Active Agents and Detergents, Vol. II, Interscience Publishers, Inc., New York (1958), especially at pages 244–247 and pages 597–605, herein incorporated by reference. So useful surface active agents include the dialkyl sulfosuccinates, the mahogany sulfonates, long chain (16–18 carbon atoms) alkyl aromatic sulfonates, dialkyl naphthalene sulfonic acids, esters of higher fatty acids, higher amine salts of naphthalene sulfonic acids, lanolin, lanolin fatty acids, naphthenic acids and their salts, glycol ethers, acyclic alcohols and keto alcohols, fatty alkylol amides and the sorbitan and polyethenoxy sorbitan nonionics.

(14) Soft Powder Products

The term "soft powder" or "soft powdered" intrachromoleucospheruloid pigment as applied to products producable by the present invention connotes the physical characteristic resulting from the treatment herein disclosed of the aqueously wet, never previously dried, cross-linked insoluble intrachromoleucospheruloid pigment with the aforesaid soft powdering agents before drying the same to a dry pigment product, i.e. the characteristic that the soft powdered dried product has such a soft form that it is in, or readily reduced to, a fine soft powder without any extended attrition, thereby being more readily dispersible in any medium than the same product not so treated. The mechanism accounting for this characteristic is not clearly understood, but it is believed that the hydrocarbon components of the soft powdering additives, which are carried onto the surfaces of the intrachromoleucospheruloid pigment particles by means of the oil soluble surfactant components thereof which may be wholly or partially removed by washing, inhibit hydrogen bridging between the intrachromoleucospheruloid pigment particles by occupying the sites at which such could occur until after the elimination from the system of the aqueous phase, said hydrocarbon composite being thereafter substantially removable at a more elevated temperature when their presence is not desired in the soft powdered product.

(15) Coagulant

By coagulant we mean any additive capable of destabilizing the emulsified system under consideration, for causing coagulation of its solids content; the coagulant used will of course vary depending largely on the type of system, i.e. the type of surfactant used and/or the functionality, if any, of the intrachromoleucospheruloic polymers. For example, anionic systems may be coagulated with either acids such as acetic or formic, hydrochloric, sulfuric, alkaline-earth metal salts, zinc and aluminum and other colorless ions of heavy metals, water soluble alcohols, or water insoluble amines preferably as their water soluble salts. Cationic systems may be coagulated with water insoluble acids, preferably as the water soluble alkali metal salts thereof and/or the water soluble amines thereof, and ammonium hydroxide or water soluble alcohols. Nonionic systems are often coagulated with water soluble alcohols with or without the addition of acids. Anionic latices of intrachromoleucospheruloid pigment may also be coagulated by combining therewith cationic latices of intrachromoleucospheruloid pigment material surfaced with cationic surfactants and vice versa.

(16) Pigment Modifying, Wedding and Bonding Agents

The organic and/or inorganic pigment components, the composites formed therefrom, and/or the intrachromoleucospheruloid pigment materials produced by the process may be modified either physically or chemically by the addition or incorporation of modifying or bonding material during or subsequent to the micronizing step. For example such material may be a bonding agent to aid in bonding the previously wedded composite organic/inorganic pigment particles in the polymer spheruloids; or to subsequently aid the fixation of the intrachromoleucospheruloid pigment product to a substrate material. The modifying agent may comprise one or more of those substances or compounds which may be employed, although not essential to the process, to obtain certain specific advantages or modifications to the process or products thereof. Such substances may include nitrogenous material such as water soluble or insoluble amines, imines and polyamines and polyimines, added to the inorganic pigment material during the micronizing step to render it more oleophilic, i.e. more substantive to the organic pigment material and the organic polymer material, and/or water soluble or dispersible condensation resin products aminoplasts or phenoplasts or the components thereof, added during the micronizing or subsequent steps for the same purpose. By reactants which form aminoplastics or aminoplasts we mean urea, melamine, thiourea and guanidine, etc., condensed with formaldehyde, glyoxal, etc. By reactants to form phenoplasts we mean phenol and/or substituted phenolic alcohols such as the resols, xylenols and/or resorcinol, etc., condensable with formaldehyde and/or higher aldehydes such as glyoxal or furfural, etc. We use the term phenolplasts in the same manner as used by T. S. Carswell in his book entitled "Phenoplasts, Their Structure, Properties and Chemical Technology," published in 1947 by Interscience Publishers, Inc., New York, N. Y. We use the term aminoplastics in the same manner that C. P. Vale uses this term in his book entitled, "Aminoplastics," published in 1950 by Cleaver-Hume Press, Ltd., London, England.

Pigment bonding agents which may be used to aid fixation of the components of the composite chromoleuco pigment to each other and to organic polymer material, may be inorganic, e.g. a water soluble alkali metal silicate or a water soluble titanium compound for example, titanium tetrachloride or oxychloride, precipitated in situ on at least the inorganic component.

A bonding agent may also be ethylenically unsaturated monomer material to be absorbed and/or adsorbed by the wedded pigment material during the micronizing step, and then be polymerized subsequently with the aid of a polymerization initiator.

The water soluble organo-silane compounds, e.g. Z6020 Silane available from Dow Chemical Company may be used to increase the affinity of the organic to the inorganic components especially in effecting the wedding of the pigment components.

Bonding agents which may be used to aid the substantivity of the inorganic to the organic phase of the intrachromoleucospheruloid pigments also include aqueous solutions or dispersions of organic polymers depositable on the inorganic pigment material and containing carboxy, amine, sulfate, and/or sulfonic acid groups, salts thereof, nitrogenous containing material such as oleophilic amines, oleophilic imines, oleophilic amine carboxylates, oleophilic quaternary ammonium compounds, water soluble polyamines, water soluble imines and combinations thereof as aforementioned.

(17) Separation by Screening

Separation by screening, or conventional screening where employed in the Examples herein, connotes that the micronized composite pigment material is washed away from the micronizing medium and the screen with diluting liquid or a part thereof.

(18) 50% Divinylbenzene

The term 50% divinylbenzene as used herein denotes the commercially available product regarded as an approximately equal mixture of divinyl and mono-vinyl materials.

(19) Microscopic Examination

The term microscopic examination as used in the Examples hereinafter denotes examination with an optical microscope, i.e. a Leitz "Ortholux" research microscope, which is regarded as having a resolving power of 0.2 micron and a lower limit of visibility for well separated particles of 0.02 micron diameter, and average particle sizes herein set forth were determined accordingly.

In the examples given hereinafter, a particular point of distinction between the preferred cross-linked embodiments of the invention and the less preferred non-cross-linked embodiments is that the cross-linking renders the spheruloids not only insoluble in physical solvents, but also nonfusible. Thus the preferred embodiments are particularly adapted for coloring plastic melts before extrusion, as the infusibility assures integrity of the spheruloids under extrusion temperatures and insures against any alteration of the flow characteristics of the melt, which may be caused by softening of the spheruloids in the case of the less preferred embodiments. In addition, the cross-linking of a polymer increases its density and thus increases its refractive index to a degree. Therefore the cross-linking, as well as the choice of monomer materials used, aids in adapting the product to have the necessary difference in refractive index from that of a vehicle in which it is intended to be used, particularly when the vehicle has a density or refractive index only slightly below that of the corresponding noncross-linked spheruloids.

Whether the spheruloids are cross-linked or non-cross-linked, their uniformity in size and spheruloidal nature particularly adapt them for use in electrostatic coating systems, and by controlling the polymerization conditions as above exemplified the size of the spheruloids may be maintained within specified limits adapting them for glass or matte finishes or for special purposes as desired.

In the Examples herein set forth the product from the polymerization step was determined by microscopic examination to be in spheruloids of less than 4.0 microns average diameter, and was essentially nonsettling i.e. a latex.

Further more, materials designated herein by chemical name under "Trade Name" are of commercial grade; those designated by proprietary name thereunder are further identified therewith.

By way of being illustrative of the scope of this invention but not to be interpreted as being restrictive in any manner, the following Examples are given in both detailed procedural and table form:

Examples 1–5Detailed step-wise procedures for producing cross-linked insoluble intrachromoleucospheruloid pigment compositions.

Tables 1–10Preparation of intrachromoleucospheruloid pigment material using cross-linked polymer material.

Tables 11–20Preparation of intrachromoleucospheruloid pigment material using noncross-linked polymer material.

Examples A et seq.Additional detailed step-wise procedures for producing intrachromoleucospheruloid pigment compositions in various forms.

EXAMPLES 1–5

Detailed step-wise Procedures for Producing Cross-linked Insoluble Intrachromoleucospheruloid Pigment Composition Example 1 (Preparation as a dry product)

To a sand mill is charged 30 grams of Perylene Red Toner (Pigment Red 123, CI 71145), 10 grams of Irgazin Yellow 3 RLT (Pigment Yellow 110), 30 grams of Titanium Dioxide pigment (TiPure LW, DuPont), 20 grams of 28% "N" Sodium Silicate (28% aqueous solution), 2 grams of Tamol SN (sodium salt of condensed naphthalene sulfonic acid), 100 grams of 20% aqueous solution of a styrene/methacrylic acid/acrylonitrile copolymer (ratio 25/65/10, NH$_4$OH salt), 10 grams of 28% NH$_4$OH, 300 ml. of water and 300 volumetric parts of Ottawa sand. The charge is milled in air for some 48 hours until a representative sample under microscopic examination shows essentially all of the pigment present to be below 0.2 micron in diameter and to be essentially free of unwedded components. The charge is separated from the micronizing medium by conventional screening and the pigment dispersion diluted to 600 ml. volume with water and placed in a vessel equipped for emulsion polymerization; 80 grams of a monomer mixture consisting of 30 grams styrene, 30 grams of methylmethacrylate and 20 grams of 50% divinylbenzene are added and the temperature raised to 40° C. 3 Grams of cumene hydroperoxide are added at this point and the polymerization mixture heated to 70°–75° C. and held at this temperature for 7 hours.

The bright orange latex is allowed to cool and diluted with an equal volume of water. The aqueous dispersion so formed is then caused to coagulate by the addition of 50 ml. of glacial acetic acid as a 20% aqueous solution. The slurry is then heated to 70° C. and filtered, washed and dried in an oven. On micropulverizing the dried presscake material, a brilliant orange red intrachromoleucospheruloid pigment is obtained which may be utilized in the coloration of oil based paints, inks and thermoplastic materials.

Example 2 (Preparation as a wet presscake pigment for flushing into oil based systems)

The procedure of Example 1 is followed with the exception that the product following filtration is retained as a wet presscake, suitable for the coloration of aqueous based systems such as paper pulp, latex paints; and also for flushing into oil based vehicles.

Example 3 (Preparation as a latex)

40 grams of Heliogen Blue BG (dry basis) in the form of a wet 35% presscake is charged to a sand grinding apparatus together with 10 grams of Titanium Dioxide pigment (TiPure R900 DuPont), 40 grams of reinforcing grade dry silica pigment HiSil 233, PPG), 10 grams of dimethylaminoethylmethacrylate, 2 grams of Duponol ME (sodium lauryl sulfate), 5 grams of a 10% aqueous solution of tetraethylenepentamine, 20 grams of Triton X405 (octylphenoxy polyethoxy ethanol), 10 ml. of 28% NH₄OH, 300 ml. of water and 300 volumetric parts of Ottawa sand. The charge is milled until a representative sample under microscopic examination shows essentially all of the pigment material therein to be below 0.2 micron in diameter and no separate unwedded components to be visible. The pigment dispersion is separated from the micronizing medium by conventional screening and charged to a vessel equipped for emulsion polymerization containing therein 50 grams of Triton X405 (octylphenoxy polyethoxy ethanol) and the volume adjusted to 700 ml. with water. A monomer mixture consisting of 50 grams of methyl methacrylate and 10 grams of ethyleneglycoldimethacrylate is added and the temperature raised to 40°–45° C. 3 Grams of cumene hydroperoxide are added and the heating continued to 70°–75° C. The polymerization reaction is held at this temperature range for 7 hours. On cooling a bright strong blue intrachromoleucospheruloid pigment latex is obtained. Microscopic examination reveals this to consist of spheruloids of organic polymer material having embedded therein the composite chromoleuco pigment composition reflecting the augmented brightness of the leuco pigment components and the augmented color of the chromo components, with no visible separation of said component pigment material, said spheruloids being essentially below 0.5 micron in diameter.

Example 4 (Preparation of Intrachromoleucospheruloid pigment in various forms)

The intrachromoleucospheruloid latex product in the preceding Example is discharged to a vessel equipped with stirrer, temperature controls and baffles for producing turbulent agitation and diluted to 2000 ml. volume with water. 20 Grams of a water soluble polyethylenimine (PEI 600 manufactured by Dow) are added, followed by 40 ml. of glacial acetic acid to effect coagulation. The slurry is stirred for 10 minutes and then 40 ml. of a 10% solution of sorbitan monolaurate dissolved in Solvent Naphtha add. The slurry is then heated to 75°–80° C. and held at this temperature range for 4–5 hours. A portion of this slurry is then filtered and washed to produce a bright blue intrachromoleucospheruloid pigment in presscake form having polyethylenimine present therein and thus having increased affinity for cellulosic material.

A portion of the slurry is spray dried to give the intrachromoleucospheruloid pigment in spray dried powder form, with similar utility to that of the presscake material, and having the added advantages of storage stability and reduced handling weight.

A portion of the filtered and washed presscake material is redispersed in sufficient water to provide a 20% solids slurry and then spray dried to give a bright blue soft powdered intrachromoleucospheruloid pigment spray dried soft powder form essentially free of water soluble surface active agent material and salts. This product is extremely suitable for the coloration of oil based vehicles, inks and thermoplastics.

A portion of the filtered and washed presscake material is oven dried to produce the intrachromoleucospheruloid pigment in soft powder form, requiring little or no further mechanical grinding to be suitable for any of the above given uses.

Example 5 (Micronizing of the dry pigment materials with monomers)

A mixture of 20 grams of Heliogen Green A, (Pigment Green 7, CI 74260), 30 grams of Irgazin Yellow 3RLT (Pigment Yellow 110) 4 grams of Monazoline T (substituted imidazoline of Tall Oil), 20 grams of HiSil 233, a precipitated dry silica pigment, 10 grams of Titanium Dioxide pigment, 100 grams of styrene, and 40 grams of dimethylaminoethylmethacrylate are micronized in a sand grinding apparatus equipped with explosion proof electrical fittings, cooling apparatus and nitrogen blanket together with 200 volumetric parts of Ottawa sand until a representative sample under microscopic examination shows that all of the pigment material is essentially below 0.2 micron in diameter and essentially free of unwedded components. 20 Grams of 50% divinylbenzene is added and the micronizing continued for 2 hours. The thus prepared composite pigment dispersion in monomer material is then separated from the grinding medium by screening and charged with rapid stirring to a vessel equipped for emulsion polymerization containing therein an aqueous solution of 35 grams of N-tallow trimethylene diamine diacetate in 400 grams of water. The emulsion polymerization mixture so formed is then heated to 45° C. at which point 200 grams of an aqueous solution containing 3 grams of potassium persulfate and 1.25 grams of sodium bisulfite are added. The reaction temperature is raised to 60°–65° C. and held at this range for 7 hours.

On cooling a bright green intrachromoleucospheruloid latex is obtained; a representative sample under microscopic examination shows essentially all of the spheruloids thereof to be below 0.5 micron in diameter and to be uniformly colored with no evidence of separation of the organic and inorganic components from the polymer spheruloids. The latex is used as is, for coloration of aqueous based systems; or may be further processed as shown in the preceding examples to yield the intrachromoleucospheruloid pigment in its various wet and dry forms.

The following tabular Examples further exemplify the application of the procedures hereinabove set forth, give the proportions of ingredients in grams, in the order of their addition and the order of the processing operations, as well as the nature of the products produced thereby.

TABLES 1–10

Preparation of Intrachromoleucospheruloid Pigment Material using Cross-linked Polymer Material

TABLE 1

| Example No. 1- | Preparation of Intrachromoleucospheruloid Pigment Composition (parts by weight) | | | | |
|---|---|---|---|---|---|
| | 1 | 2 | 3 | 4 | 5 |
| A. Micronizing Step | | | | | |
| 1. Organic Color Pigment | | | | | |
| Class | Phthalocyanine | Vat | Azo | Quinseridone | Aso |

TABLE 1-continued

Preparation of Intrachromoleucospheruloid Pigment Composition
(parts by weight)

| Example No. 1- | | 1 | 2 | 3 | 4 | 5 |
|---|---|---|---|---|---|---|
| | Trade Name | Heliogen Blue EG | Ponsol Jade Green | Permanent Carmine | Magenta | Permagon Yellow |
| | Color Index Name | Blue 15 | Green 1 | Red 5 | Red 122 | Yellow 14 |
| | Color Index Number | 74160 | 59825 | 12490 | — | 21095 |
| | Pigment, dry basis | 1* | 10 | 20 | 25 | 50 |
| 2. | Inorganic Pigment | | | | | |
| | Trade Name | HiSil 233 | HiSil 404 | Cab-O-Sil H-5 | — | Cab-O-Sil H5 |
| | Pigment, dry basis | 90 | 30 | 50 | — | 0.25 |
| 3. | Inorganic Pigment | | | | | |
| | Trade Name | TiPure R900 | TiPure LW | — | TiPure R941 Slurry | TiPure LW |
| | Pigment, dry basis | 9 | 40 | — | 50 | 0.25 |
| 4. | Surface Active Agent** Material (Trade Name) | | | | | |
| | Alipal CO 433[1] | 9 | 40 | 25 | 25 | 25. |
| | Tamol SN[2] | 1 | — | — | — | 2 |
| | Monazoline T[3] | 1 | 1 | — | — | 1 |
| | Ammonium Hydroxide 28% | 10 | — | — | 5 | 10 |
| | Acetic Acid | — | 5 | 5 | — | — |
| 5. | Water, quantity | 500 | 300 | 400 | 395 | 300 |
| 6. | Micronizing Step | | | | | |
| | Method | Sand | Sand | Sand | Ball | Ball |
| | Time, Hours, approx. | 48 | 32 | 24 | 48 | 32 |
| | Temperature, °C. | 28 | 28 | 28 | 28 | 28 |
| | Average Particle Size Diameter (microns) of Composite Pigment | <0.2 | <0.2 | <0.2 | <0.2 | <0.2 |
| 7. | Separation, Screening (X) | X | X | X | X | X |
| 8. | Water, dilution | 1000 | 300 | 300 | 200 | 211.5 |
| 9. | Yield - Aqueous Pigment Composition (dispersion) | 1621 | 686 | 800 | 700 | 600 |
| B. | Polymerization Step | | | | | |
| 10. | Surface Active Agent** | | | | | |
| | (a) Quantity, type | 130[1] | — | 25[1] | 9[1] | — |
| | (b) Quantity, type | — | — | 1[3] | 1[3] | — |
| | Water | 50 | — | 24 | — | — |
| | Acetic Acid | — | — | — | — | — |
| | Ammonium Hydroxide 28% | 20 | — | — | 10 | 5 |
| 11a. | Monomer Material Non Crosslinking | | | | | |
| | Styrene | 800 | 6 | 38 | 40 | — |
| | Dimethylaminoethylmethacrylate | — | — | 2 | — | — |
| | Methylmethacrylate | — | — | 40 | — | 50 |
| | 4-vinylpyridine | — | — | — | 10 | — |
| 11b. | Monomer Material Crosslinking | | | | | |
| | Divinylbenzene 50% | 200 | 2 | 20 | 10 | — |
| | Ethyleneglycoldimethacrylate | — | — | — | — | 10 |
| 12. | Polymerization Initiator | | | | | |
| | AZDN[4] | 20 | 1 | — | 3 | 2 |
| | Potassium Persulfate | — | — | 3 | — | — |
| | Sodium Bisulfite | — | — | 1.5 | — | — |
| 13. | Polymerization Conditions | | | | | |
| | Time, hours, approx. | 10 | 4 | 5 | 6 | 5 |
| | Temperature, °C. | 80 | 80 | 70 | 75 | 80 |
| | Conversion, approx. 100% (X) | X | X | X | X | X |
| 14. | Intrachromoleucospheruloid Pigment Dispersion Yield | 2821 | 694 | 950 | 580 | 667 |
| | Average Particle Size Diameter (microns) | <4.0 | <4.0 | <4.0 | <4.0 | <4.0 |

*used as wet presscake material
**capable of effecting emulsion polymerization
[1]sodium salt of a sulfate ester of an alkylphenoxy poly(ethyleneoxy)ethanol (28% active)
[2]sodium salt of a condensed napthalene sulfonic acid
[3]substituted imidazoline of tall oil (100% active)
[4]azobisisobutyronitrile
TiPure tradename for DuPont titanium dioxide pigment
HiSil tradename for PPG Industries precipitated silica
Cab-O-Sil tradename for Cabot Corporation pyrogenic silica

TABLE 2

Preparation of Intrachromoleucospheruloid Pigment Composition
(parts by weight)

| Example No. 2- | 1 | 2 | 3 | 4 | 5 |
|---|---|---|---|---|---|
| A. Micronizing Step | | | | | |
| 1. Organic Color Pigment | | | | | |
| Class | Dioxazine | Azamethine | Phthalocyanine | Vat | Misc. |
| Trade Name | Heliogen Violet R Toner | Irgazin Yellow 2 GLT | Heliogen Green A | Indanthrene Pink R | Aniline Black |
| Color Index Name | Violet 23 | Yellow 109 | Green 7 | Red 1 | Black 1 |
| Color Index Number | 51319 | — | 74260 | 73360 | 50440 |
| Pigment, dry basis | 20 | 30 | 25* | 30* | 30 |
| 2. Inorganic Pigment | | | | | |
| Trade Name | TiPure R941 Slurry | — | — | — | — |
| Pigment, dry basis | 30 | — | — | — | — |
| 3. Inorganic Pigment | | | | | |
| Trade Name | HiSil 404 | Cab-O-Sil M5 | Micro-Cel T38 | A-Sil-Ate W | Santocel 62 |
| Pigment, dry basis | 30 | 40 | 50 | 40 | 45 |
| 4. Surface Active Agent** Material (Trade Name) | | | | | |
| Triton X405[1] | 80 | — | — | 40 | 30 |
| Triton X400[2] | — | 25 | — | — | — |
| Ducmeen T[3] | — | — | 20 | — | — |
| Monaquat TIBO[4] | — | — | — | 1 | 1 |
| Ammonium Hydroxide 28% | 10 | — | — | — | — |
| Acetic Acid | — | 10 | 10 | 5 | 2 |
| 5. Water, quantity | 330 | 395 | 395 | 384 | 392 |
| 6. Micronizing | | | | | |
| Method | Ball | Sand | Sand | Ball | Sand |
| Time, hours, approx. | 48 | 48 | 36 | 60 | 36 |
| Temperature, °C. | 28 | 28 | 28 | 28 | 28 |
| Average Particle Size Diameter (microns) of Composite Pigment | <0.2 | <0.2 | <0.1 | <0.1 | <0.1 |
| 7. Separation, Screening (X) | X | X | X | X | X |
| 8. Water, dilutions | 200 | 200 | 200 | 300 | 300 |
| 9. Yield, Aqueous Pigment Composition (dispersion) | 700 | 700 | 700 | 800 | 800 |
| B. Polymerization Step | | | | | |
| 10. Surface Active Agent** | | | | | |
| (a) Quantity, type | 200[1] | 20[1] | — | 20[1] | 3[4] |
| (b) Quantity, type | — | — | — | — | — |
| Water | — | 75 | — | 70 | 5 |
| Ammonium Hydroxide 28% | 20 | — | — | 10 | — |
| Acetic Acid | — | 5 | — | — | 2 |
| 11a. Monomer Material Non Crosslinking | | | | | |
| Styrene | 18 | 80 | 40 | 80 | 20 |
| Cyclohexylmethacrylate | — | 10 | 40 | — | 60 |
| Dimethylaminoethylmethacrylate | — | — | 10 | 2 | 10 |
| 11b. Monomer Material Crosslinking | | | | | |
| Divinylbenzene 50% | 2 | 10 | — | 18 | — |
| Ethyleneglycoldimethacrylate | — | — | 10 | — | 10 |
| 12. Polymerization Initiator | | | | | |
| AZDN[5] | — | 3 | — | 3 | 3 |
| Cumene Hydroperoxide | 2 | — | 3 | — | — |
| 13. Polymerization Conditions | | | | | |
| Time, hours, approx. | 4 | 5 | 6 | 6 | 5 |
| Temperature, °C. | 80 | 80 | 75 | 80 | 80 |
| Conversion, approx. 100% (X) | X | X | X | X | X |
| 14. Intrachromoleucospheruloid Pigment Dispersion | | | | | |
| Yield | 900 | 900 | 800 | 1000 | 910 |
| Average Particle Size | | | | | |

TABLE 2-continued

Preparation of Intrachromoleucospheruloid Pigment Composition (parts by weight)

| Example No. 2- | 1 | 2 | 3 | 4 | 5 |
|---|---|---|---|---|---|
| Diameter (microns) | <4.0 | <4.0 | <4.0 | <4.0 | <4.0 |

Example 2-2-a This example is prepared exactly as in Example 2-2 except that the 10 parts of 50% divinylbenzene are added subsequent to the initial polymerization in step 13 and polymerized sequentially in the Intrachromoleucospheruloid pigment composition (14) with the aid of ¼ part of azobisisobutyrnitrile to yield a cross-linked Intrachromoleucospheruloid pigment composition.

Example 2-4-a This example is prepared exactly as in example 2-4 except that the 18 parts of 50% divinylbenzene are added subsequent to the initial polymerization in step 13 together with 12 parts of cyclohexylmethacrylate and 1 part of azobisisobutyronitrile and polymerized sequentially in the Intrachromoleucospheruloid pigment composition (14) to yield 1012 parts of cross-linked Intrachromoleucospheruloid pigment composition.

*used as wet presscake material
**capable of effecting emulsion polymerization
[1] octylphenoxy polyethoxy ethanol (70% active)
[2] stearyl dimethyl benzyl ammonium chloride (82% active)
[3] N-tallow trimethylene diamine (85% active)
[4] substituted imidazoline quaternized with benzyl chloride (100% active)
[5] azobisisobutyronitrile.

TiPure tradename for DuPont titanium dioxide pigment
HiSil tradename for PPG Industries precipitated silica
Cab-O-Sil tradename for Cabot Corporation pyrogenic silica
Micro-cel tradename for Johns-Mansville calcium silicate
A-Sil-Ate tradename for Freeport Kaolin Company aluminum silicate
Santocel tradename for Monsanto Corporation aerogel silica

TABLE 3

Preparation of Intrachromoleucospheruloid Pigment Composition (parts by weight)

| Example No. 3 | 1 | 2 | 3 | 4 | 5 |
|---|---|---|---|---|---|
| A. Micronizing Step | | | | | |
| 1. Organic Color Pigment | | | | d | |
| Class | Vat | Azamethine | Quinacridone | Phthalo-cyanine | Azo |
| Trade Name | Indanthrene Brilliant Orange RK | Irgazin Red 2 BLT | Monastral Red Y | Polymon Blue G | Permanent Carmine |
| Color Index Name | Orange 7 | Red 180 | Violet 19 | Blue 16 | Red 5 |
| Color Index Number | 71105 | — | 46500 | 74100 | 12490 |
| Pigment, dry basis | 40* | 30 | 25 | 30 | 35 |
| 2. Inorganic Pigment | | | | | |
| Trade Name or type | HiSil 404 | TiPure R941 Slurry | Unitane OR 450 | Titanox RA47 | Horse-Head R771 |
| Pigment, dry basis | 20 | 32 | 30 | 40 | 50 |
| 3. Inorganic Pigment | | | | | |
| Trade Name or type | HiSil 233 | HiSil 233 | Cab-O-Sil M5 | HiSil 233 | HiSil 233 |
| Pigment, dry basis | 30 | 40 | 20 | 30 | 30 |
| 4. Surface Active Agent** Material (Trade Name) | | | | | |
| Alipal CO 433[1] | 20 | 10 | — | — | — |
| Triton X405[2] | — | 50 | 20 | — | 10 |
| Duomeen T[3] | — | — | — | 25 | 30 |
| Monazoline T[4] | — | 1 | 1 | — | — |
| Zonyl FSA[5] | 1 | — | — | — | — |
| Zonyl FSO[6] | — | — | — | 1 | — |
| Ammonium Hydroxide 28% | 10 | 10 | 5 | — | — |
| Acetic Acid | — | — | — | 12 | 15 |
| 5. Water, quantity | 479 | 327 | 399 | 362 | 330 |
| 6. Micronizing | | | | | |
| Method | Ball | Sand | Sand | Ball | Ball |
| Time, hours, approx. | 36 | 48 | 48 | 60 | 60 |
| Temperature, °C. | 28 | 28 | 28 | 28 | 28 |
| Average Particle Size Diameter (microns) of Composite Pigment | <0.05 | <0.1 | <0.2 | <0.02 | <0.2 |
| 7. Separation, Screening (X) | X | X | X | X | X |
| 8. Water, dilution | 300 | 300 | 300 | 200 | 200 |
| 9. Yield - Aqueous Pigment Composition (dispersion) | 900 | 800 | 800 | 700 | 700 |
| B. Polymerization Step | | | | | |
| 10. Surface Active Agent** | | | | d | |
| (a) Quantity, type | 20[2] | 20[1] | 20[1] | 29[3] | 25[2] |
| (b) Quantity, type | — | — | 20[2] | — | — |
| Water | 25 | 70 | 50 | 63 | 20 |
| Ammonium Hydroxide 28% | 5 | 10 | 10 | — | — |
| Acetic Acid | — | — | — | 12 | 5 |
| 11a. Monomer Material Non Crosslinking | | | | | |

TABLE 3-continued

Preparation of Intrachromoleucospheruloid Pigment Composition
(parts by weight)

| Example No. 3 | 1 | 2 | 3 | 4 | 5 |
|---|---|---|---|---|---|
| Styrene | 30 | — | — | 40 | 60 |
| Methylmethacrylate | 40 | 50 | — | 40 | 50 |
| Diethylaminoethylmethacrylate | 5 | 10 | 5 | 5 | 5 |
| Cyclohexylmethacrylate | — | 20 | — | — | 15 |
| 11b. Monomer Material Crosslinking | | | | | |
| Divinylbenzene 50% | 10 | — | — | — | 20 |
| Allylacrylate | 5 | 10 | — | 5 | — |
| Ethyleneglycoldimethacrylate | — | 10 | 95 | 10 | — |
| 12. Polymerization Initiator | | | | | |
| AZDN[7] | 3 | 4 | 5 | 2 | 5 |
| Cumene Hydroperoxide | 1 | — | — | 2 | — |
| 13. Polymerization Conditions | | | | | |
| Time, hours, approx. | 6 | 8 | 8 | 5 | 7 |
| Temperature, °C. | 80 | 75 | 80 | 80 | 80 |
| Conversion, approx. 100% (X) | X | X | X | X | X |
| 14. Intrachromoleucospheruloid Pigment Dispersion | | | | | |
| Yield | 1040 | 1000 | 1000 | 900 | 900 |
| Average Particle Size Diameter (microns | <4.0 | <4.0 | <4.0 | <4.0 | <4.0 |

*used as wet presscake material
**capable of effecting emulsion polymerization
[1]sodium salt of a sulfate ester of an alkylphenoxypoly(ethyleneoxy)ethanol (28% active)
[2]octylphenoxy polyethoxy ethanol (70% active)
[3]N-tallow trimethylene diamine (85% active)
[4]substituted imidazoline of tall oil (100% active)
[5]fluorochemical surface active agent (50% active)
[6]fluorochemical surface active agent (50% active)
[7]azobisisobutyronitrile
TiPure tradename for DuPont titanium dioxide pigment
Unitane tradename for American Cyanamid Company titanium dioxide pigment
Titanox tradename for National Lead Industries titanium dioxide pigment
Horsehead tradename for New Jersey Zinc Company titanium dioxide pigment
HiSil tradename for PPG Industries precipitated silica
Cab-O-Sil tradename for Cabot Corporation pyrogenic silica

TABLE 4

Preparation of Intrachromoleucospheruloid Pigment Composition
(parts by weight)

| Example No. 4- | 1 | 2 | 3 | 4 | 5 |
|---|---|---|---|---|---|
| A. Micronizing Step | | | | | |
| 1. Organic Color Pigment | | | | | |
| Class | Phthalocyanine | Vat | Cond. Azo | Dioxazine | Vat |
| Trade Name | Green Y.E.X. | Amanthren Black BHN | Chromoptal Red BR | Heliogen Violet | Indanthren Blue BC |
| Color Index Name | Green 41 | Green 9 | — | Violet 23 | Blue 6 |
| Color Index Number | — | 59850 | — | 51319 | 69825 |
| Pigment, dry basis | 20 | 40 | 30 | 20* | 40* |
| 2. Inorganic Pigment | | | | | |
| Trade Name or type | Tronex CR800 | Unitane OR520 | Unitane OR640 | TiPure R960 | Barium Sulfate Pigment White 5 |
| Pigment, dry basis | 30 | 20 | 40 | 30 | 20 |
| 3. Inorganic Pigment | | | | | |
| Trade Name or Type | Zinc Oxide (Pig. White 4) | Cab-O-Sil M5 | HiSil 233 | HiSil 404 | TiPure R941 Slurry |
| Pigment, dry basis | 15 | 20 | 30 | 20 | 32 |
| 4. Surface Active Agent** Material (Trade Name) | | | | | |
| Alipal CO433[1] | 18 | — | — | — | 10 |
| Triton X405[2] | 30 | 10 | 20 | — | 25 |
| Duomac T[3] | — | 20 | — | 30 | — |
| Monaquat TIBC[4] | 2 | — | 20 | — | 2 |
| Zonyl FSB[5] | — | — | 1 | 1 | — |
| Tamol SN[6] | 2 | — | — | — | — |
| Ammonium Hydroxide 28% | 10 | — | — | — | 10 |
| Acetic Acid | — | 10 | 10 | 15 | — |
| 5. Water, quantity | 373 | 280 | 299 | 384 | 361 |
| 6. Micronizing | | | | | |
| Method | Sand | Ball | Ball | Ball | Sand |
| Time, hours, approx. | 24 | 36 | 60 | 48 | 48 |

TABLE 4-continued

Preparation of Intrachromoleucospheruloid Pigment Composition
(parts by weight)

| Example No. 4- | 1 | 2 | 3 | 4 | 5 |
|---|---|---|---|---|---|
| Temperature, °C. | 28 | 28 | 28 | 28 | 28 |
| Average Particle Size Diameter (microns) of Composite Pigment | <0.1 | <0.05 | <0.2 | <0.2 | <0.1 |
| 7. Separation Screening (X) | X | X | X | X | X |
| 8. Water, dilution | 200 | 200 | 250 | 200 | 250 |
| 9. Yield Aqueous Pigment Composition (dispersion) | 700 | 600 | 700 | 700 | 750 |
| B. Polymerization Step | | | | | |
| 10. Surface Active Agent** | | | | | |
| (a) Quantity, type | 30$^2$ | 20$^2$ | 40$^2$ | 20$^2$ | 100$^1$ |
| (b) Quantity, type | — | 10$^3$ | 10$^4$ | — | — |
| Water | 60 | 65 | 45 | — | — |
| Ammonium Hydroxide 28% | 10 | — | — | — | 10 |
| Acetic Acid | — | 5 | 5 | — | — |
| 11a. Monomer Material Non Crosslinking | | | | | |
| Styrene | 80 | 60 | 40 | — | — |
| Vinyltoluene | 10 | — | — | 40 | — |
| Methylmethacrylate | — | 40 | 30 | 20 | — |
| Dimethylaminoethylmethacrylate | 2 | 2 | — | 5 | — |
| 11b. Monomer Material Crosslinking | | | | | |
| Divinylbenzene 50% | — | 18 | — | — | — |
| Ethyleneglycoldimethacrylate | 8 | — | 10 | 5 | 90 |
| 12. Polymerization Initiator | | | | | |
| Potassium Persulfate | 3 | — | 3 | — | — |
| Sodium Bisulfite | 1.5 | — | 1.5 | — | — |
| AZDN$^7$ | — | 3 | — | 3 | 4 |
| 13. Polymerization Conditions | | | | | |
| Time, hours, approx. | 7 | 7 | 6 | 5 | 6 |
| Temperature, °C. | 60 | 75 | 65 | 75 | 80 |
| Conversion, approx. 100% (X) | X | X | X | X | X |
| 14. Intrachromoleucospheruloid Pigment Dispersion | | | | | |
| Yield | 900 | 820 | 880 | 800 | 900 |
| Average Particle Size Diameter (microns) | <4.0 | <4.0 | <4.0 | <4.0 | <4.0 |

Example 4-1-a. This example is prepared exactly as in Example 4-1 except that the 30 parts of titanium dioxide, Tronex CR800 are replaced by 30 parts of a natural silica pigment, Min-U-Sil (produced by PGS).
Example 4-2-a. This example is prepared exactly as in Example 4-2 except that the 20 parts of Cab-O-Sil N5 are replaced by 20 parts of zirconium silicate, "Excelopox" (manufactured by NL Tam. Div.)
Example 4-2-b. This example is prepared exactly as in Example 4-2 except that the 20 parts of Unitane OR520 are replaced by 20 parts of zirconium oxide, pigment white 12. (Manufactured by NL Tam. Div.)
Example 4-2-c. This example is prepared exactly as in Example 4-2 except that the 20 parts of Cab-O-Sil M5 are replaced by 20 parts of alumina hydrate (manufactured by Alcoa).
Example 4-5-a. This example is prepared exactly as in Example 4-5 except that the 20 parts of Barium Sulfate Pigment White 5 are replaced by 20 parts of Celite 110, a natural silica pigment (manufactured by Johns-Manville Company).
Example 4-5-b. This example is prepared exactly as in Example 4-5 except that the 20 parts of Barium Sulfate Pigment White 5 are replaced by 20 parts of Pigment White 20, aluminum Potassium Silicate.
*used as wet presscake material
**capable of effecting emulsion polymerization
[1]sodium salt of a sulfate ester of an alkylphenoxy poly(ethyleneoxy)ethanol (28% active)
[2]octylphenoxy polyethoxy ethanol (70% active)
[3]N-tallow trimethylene diamine diacetate (85% active)
[4]substituted imidazoline quaternized with benzyl chloride (100% active)
[5]fluorochemical surface active agent (50% active)
[6]sodium salt of a condensed naphthalene sulfonic acid
[7]azobisisobutyronitrile
Tronex tradename for Kerr-McGee Company titanium dioxide pigment
Unitane tradename for American Cyanamid Company titanium dioxide pigment
TiPure tradename for DuPont titanium dioxide pigment
Cab-O-Sil tradename for Cabot Corporation pyrogenic silica
HiSil tradename for P. Industries precipitated silica

TABLE 5

Preparation of Intrachromoleucospheruloid Pigment Composition
(parts by weight)

| Example No. 5- | 1 | 2 | 3 | 4 | 5 |
|---|---|---|---|---|---|
| A. Micronizing Step | | | | | |
| 1. Organic Color Pigment | | | | | |
| Class | Phthalo-cyanine | Phthalo-cyanine | Vat | Vat | Azemethine |
| Trade Name | Heliogen Blue BG | Heliogen Green A | Ponsol Jade Green | Indanthrene Red FBBA | Irgazin Red 2BLT |

TABLE 5-continued

Preparation of Intrachromoleucospheruloid Pigment Composition
(parts by weight)

| Example No. 5- | 1 | 2 | 3 | 4 | 5 |
|---|---|---|---|---|---|
| Color Index Name | Blue 15 | Green 7 | Green 1 | Red 10 | Red 180 |
| Color Index Number | 74160 | 74260 | 59825 | 67000 | — |
| Pigment, dry basis | 25* | 30 | 30* | 35 | 25 |
| 2. Inorganic Pigment | | | | | |
| Trade Name or Type | Titanox RA | Unitane 0220 | TiPure R941 | TiPure R900 | Titanox RA |
| Pigment, dry basis | 30 | 40 | 40 | 50 | 30 |
| 3. Inorganic Pigment | | | | | |
| Trade Name or Type | HiSil 233 | HiSil 404 | Cab-O-Sil M-5 | Ludox Colloidal Silica | Barcid Maceloid |
| Pigment, dry basis | 20 | 30 | 40 | 40 | 10 |
| 4. Surace Active Agent** Material, Trade Name | | | | | |
| Triton X305[1] | 20 | — | 10 | — | — |
| Triton X400[2] | — | 20 | — | 20 | — |
| Triton X405[3] | 20 | 20 | 30 | — | 20 |
| Tamol SN[4] | 2 | — | 1 | — | — |
| Duomeen T[5] | 2 | — | 1 | 20 | 1 |
| Ammonium Hydroxide 28% | — | — | — | — | — |
| Acetic Acid | — | 5 | 5 | 10 | 5 |
| 5. Water, quantity | 331 | 355 | 343 | 325 | 309 |
| 6. Micronizing | | | | | |
| Method | Sand | Sand | Sand | Ball | Sand |
| Time, hours, approx. | 36 | 24 | 36 | 72 | 48 |
| Temperature, °C. | 28 | 28 | 28 | 28 | 28 |
| Average Particle Size Diameter (microns) of Composite Pigment | <0.02 | <0.2 | <0.1 | <0.02 | <0.1 |
| 7. Separation Screening (X) | X | X | X | X | X |
| 8. Water, dilution | 250 | 200 | 200 | 200 | 200 |
| 9. Yield, Aqueous Pigment Composition (dispersion) | 700 | 700 | 700 | 700 | 600 |
| B. Polymerization Step | | | | | |
| 10. Surface Active Agent** | | | | | |
| (a) Quantity- type | — | 20[3] | — | 20[5] | 40[3] |
| (b) Quantity- type | — | — | — | — | — |
| Water | — | 20 | — | 70 | 35 |
| Ammonium Hydroxide 28% | 10 | — | — | — | 25 |
| Acetic Acid | — | 10 | — | 10 | — |
| 11a. Monomer Material Non Crosslinking | | | | | |
| Vinyltoluene | 75 | 70 | 70 | 60 | 78 |
| 4-Vinylpyridine | 5 | 5 | 10 | 10.5 | — |
| Methacrylic Acid | — | — | — | 8.5 | — |
| Methylmethacrylate | — | — | — | 10 | 20 |
| Dimethylaminoethylmethacrylate | — | — | — | 1 | 12 |
| 11b. Monomer Material Crosslinking | | | | | |
| Divinylbenzene 50% | 9.5 | 15 | 20 | — | — |
| Oiticica Oil | 0.5 | — | — | — | 10 |
| Ethyleneglycoldimethacrylate | — | — | — | 10 | — |
| 12. Polymerization Initiator | | | | | |
| AZDN[6] | 3 | — | 3 | 4 | 4 |
| Cumene Hydroperoxide | — | 3 | — | — | — |
| 13. Polymerization Conditions | | | | | |
| Time, hours, approx. | 6 | 5 | 5 | 6 | 7 |
| Temperature, °C. | 90 | 80 | 80 | 75 | 90 |
| Conversion, approx. 100% (X) | X | X | X | X | X |
| 14. Intrachromoleucospheruloid Pigment Dispersion | | | | | |
| Yield | 800 | 840 | 800 | 900 | 800 |
| Average Particle Size | | | | | |

TABLE 5-continued

Preparation of Intrachromoleucospheruloid Pigment Composition
(parts by weight)

| Example No. 5- | 1 | 2 | 3 | 4 | 5 |
|---|---|---|---|---|---|
| Diameter (microns) | <4.0 | <4.0 | <4.0 | <4.0 | <4.0 |

Example 5-1-a. This example is prepared exactly as Example 5-1 except that the 30 parts of titanium dioxide are replaced by 20 parts of magnesium oxide.
Example 5-1-b. This example is prepared exactly as Example 5-1 except that the 30 parts of titanium dioxide are replaced by 30 parts of alumina.
Example 5-1-c. This example is prepared exactly as in example 5-1 except that the 20 parts of silica (HiSil 233) are replaced by 20 parts of hydrated aluminum oxide.
Example 5-3-a. This example is prepared exactly as in Example 5-3 except that the 40 parts of titanium dioxide are replaced by 40 parts of antimony oxide.
Example 5-3-b. This example is prepared exactly as in Example 5-3 except that the 40 parts of titanium dioxide are replaced with 40 parts of zinc oxide.
Example 5-5-a. This example is prepared exactly as in Example 5-5 except that the 40 parts of titanium dioxide are replaced with 40 parts of zirconium oxide.
*used as wet presscake material
**capable of effecting emulsion polymerization
[1]octylphenoxy polyethoxy ethanol (70% active)
[2]stearyl dimethyl benzyl ammonium chloride (82% active)
[3]octylphenoxy polyethoxy ethanol (70% active)
[4]sodium salt of a condensed naphthalene sulfonic acid
[5]N-tallow trimethylene diamine (85% active)
[6]azobisisobutyronitrile
Titanox tradename for National Lead Industries titanium dioxide pigment
Unitane tradename for Amerian Cyanamide Company titanium dioxide pigment
TiPure tradename for DuPont titanium dioxide pigment
HiSil tradename for PPG Industries precipitated silica
Cab-O-Sil tradename for Cabot Corporation pyrogenic silica
Ludox tradename for DuPont colloidal silica
Baroid Macaloid tradename for NL Industries magnesium silicate

TABLE 6

Preparation of Intrachromoleucospheruloid Pigment Composition
(parts by weight)

| Example No. 6- | 1 | 2 | 3 | 4 | 5 |
|---|---|---|---|---|---|
| A. Micronizing Step | | | | | |
| 1. Organic Color Pigment | | | | | |
| Class | Phthalocyanine | Dioxazine | Vat | Triphenyl methane | Vat |
| Trade Name | Heliogen Blue BG | Carbazole Violet | Perylene Red | Victoria Blue | Brilliant Orange RK |
| Color Index Name | Blue 15 | Violet 23 | Red 29 | Blue 1 | Orange 3 |
| Color Index Number | 74160 | 51319 | 71140 | 42595 | 59300 |
| Pigment, dry basis | 25* | 20* | 30 | 15 | 30 |
| 2. Inorganic Pigment | | | | | |
| Trade Name or Type | TiPure R941 Slurry | TiPure LW | Titanox RA 45 | Unitase OR 560 | TiPure LW |
| Pigment, dry basis | 40 | 20 | 40 | 30 | 30 |
| 3. Inorganic Pigment | | | | | |
| Trade Name or Type | HiSil 233 | Excelopax Zirconium Silicate | Oncor 23A | HiSil EP | Silene D |
| Pigment, dry basis | 30 | 30 | 20 | 30 | 20 |
| 4. Surface Active Agent Material (Trade Name) | | | | | |
| Triton X405[1] | 10 | 5 | 20 | 30 | — |
| Alipal CO433[2] | 72 | 5 | — | — | 20 |
| Tamol 731[3] | — | 5 | — | — | — |
| Monazoline T[4] | 1 | 1 | 20 | — | 2 |
| SAMV Amph. Copolymer[5] | — | — | 20 | — | 20 |
| N-group polymer[6] | — | 10 | — | 20 | — |
| SMA Copolymer[7] | 20 | — | — | — | — |
| Sulfobetaine DC 50%[8] | — | — | 10 | — | — |
| Ammonium Hydroxide 28% | 10 | 5 | — | — | 10 |
| Acetic Acid | — | — | 5 | 5 | — |
| 5. Water, quantity | 292 | 299 | 235 | 270 | 268 |
| 6. Micronizing Step | | | | | |
| Method | Ball | Sand | Sand | Ball | Sand |
| Time, hours, approx. | 36 | 48 | 48 | 60 | 32 |
| Temperature, °C. | 28 | 28 | 28 | 28 | 28 |
| Average Particle Size Diameter (microns) of Composite Pigment | <0.2 | <0.2 | <0.2 | <0.2 | <0.2 |
| 7. Separation, Screening (X) | X | X | X | X | X |
| 8. Water, dilution | 200 | 300 | 300 | 200 | 300 |
| 9. Yield, Aqueous Pigment Composition (dispersion) | 700 | 700 | 700 | 600 | 700 |
| B. Polymerization Step | | | | | |

TABLE 6-continued

Preparation of Intrachromoleucospheruloid Pigment Composition
(parts by weight)

| Example No. 6- | 1 | 2 | 3 | 4 | 5 |
|---|---|---|---|---|---|
| 10. Surface Active Agent | | | | | |
| (a) Quantity, type | — | 25[1] | 20[1] | 20[1] | 20[1] |
| (b) Quantity, type | — | 10[6] | 10[2] | 20[2] | 20[8] |
| Water | — | 55 | 70 | 60 | 55 |
| Ammonium Hydroxide 28% | — | 10 | — | — | 5 |
| Acetic Acid | — | — | — | — | — |
| 11a. Monomer Material Non Crosslinking | | | | | |
| Styrene | 80 | 60 | — | 20 | — |
| Methylmethacrylate | — | 10 | 20 | — | 43 |
| Cyclohexylmethacrylate | — | 10 | 10 | 20 | — |
| Diethylaminoethylmethacrylate | — | — | — | — | 2 |
| 11b. Monomer Material Crosslinking | | | | | |
| Divinylbenzene 50% | 20 | 10 | — | 10 | — |
| Allylacrylate | — | 10 | — | — | — |
| Ethyleneglycoldimethacrylate | — | — | 4.5 | — | 5 |
| Tung Oil | — | — | 0.5 | — | — |
| 12. Polymerization Initiator | | | | | |
| AZDN[9] | 3 | 4 | — | 2 | 2 |
| Cumene Hydroperoxide | — | — | 3 | — | — |
| 13. Polymerization Conditions | | | | | |
| Time, hours, approx. | 5 | 6 | 5 | 4 | 4 |
| Temperature, °C. | 80 | 75 | 85 | 80 | 80 |
| Conversion, approx. 100% (X) | X | X | X | X | X |
| 14. Intrachromoleucospheruloid Pigment Dispersion | | | | | |
| Yield | 800 | 900 | 835 | 750 | 850 |
| Average Particle Size Diameter (microns) | <4.0 | <4.0 | <4.0 | <4.0 | <4.0 |

*used as wet presscake material
**capable of effecting emulsion polymerization
[1]octylphenoxy polyethoxy ethanol (70% active)
[2]sodium salt of sulfate ester of an alkylphenoxy poly(ethyleneoxy)ethanol (28% active)
[3]sodium salt of a polycarboxylic acid (100% active)
[4]substituted imidazoline of tall oil
[5]copolymer of styrene, acrylonitrile, methacrylic acid and 4-vinylpyridine, ratio 25/10/29/36
[6]4-vinylpyridine homopolymer
[7]Copolymer of styrene, methacrylic acid and acrylonitrile, ratio 25/65/10
[8]stripped coco ammonium sulfonic acid betaine (50% active)
[9]azobisisobutyronitrile
TiPure tradename for DuPont titanium dioxide pigment
Titanox tradename for National Lead Industries titanium dioxide pigment
Unitane tradename for American Cyanamid titanium dioxide pigment
HiSil tradename for PPG precipitated silica
Excelopax tradename for National Lead Industries zirconium silicates
Uncor tradename for National Lead Industries antimony oxide/silica pigment
Silene tradename for PPG precipitated silica

TABLE 7

Preparation of Intrachromoleucospheruloid Pigment Composition
(Parts by weight)

| Example No. 7- | 1 | 2 | 3 | 4 | 5 |
|---|---|---|---|---|---|
| A. Micronizing Step | | | | | |
| 1. Organic Color Pigment | | | | | |
| Class | Vat | Azo | Quinacridone | Phthalocyanine | Dioxazine |
| Trade Name | Ponsol Jade Green | Permagen Yellow | Magenta | Polymon Blue G | Irgazin Violet 6RLT |
| Color Index Name | Green 1 | Yellow 14 | Red 122 | Blue 16 | — |
| Color Index Number | 59825 | 21095 | — | 74100 | — |
| Pigment, dry basis | 20* | 40 | 20* | 30 | 20 |
| 2. Inorganic Pigment | | | | | |
| Trade Name | HiSil 233 | Excelopax Zirconium Silicate | Micro-cel T-38 | Cab-O-Sil M-5 | HiSil 404 |
| Pigment, dry basis | 30 | 30 | 10 | 30 | 30 |
| 3. Inorganic Pigment | | | | | |
| Trade Name | TiPure LW | Oncor 23A | Aluminum Oxide | TiPure R941 | TiPure LW |
| Pigment, dry basis | 20 | 30 | 20 | 40 | 40 |
| 4. Surface Active Agent** Material, Trade Name | | | | | |
| Alipal CO 433[1] | 20 | — | — | 10 | — |
| Monazoline T[2] | 2 | — | — | — | 2 |

TABLE 7-continued

Preparation of Intrachromoleucospheruloid Pigment Composition
(Parts by weight)

| Example No. 7- | 1 | 2 | 3 | 4 | 5 |
|---|---|---|---|---|---|
| Zonyl FSH[3] | 1 | — | — | — | — |
| Duomeen T[4] | — | 20 | — | 2 | 20 |
| Monaquat TIBC[5] | — | 10 | 10 | — | 10 |
| Triton X405[6] | — | — | 5 | 20 | — |
| Ammonium Hydroxide | — | — | — | 10 | — |
| Acetic Acid | — | 10 | — | — | 10 |
| 5. Water, quantity | 298 | 260 | 235 | 258 | 368 |
| 6. Micronizing Step | | | | | |
| Method | Sand | Sand | Sand | Sand | Ball |
| Time, hour, approx. | 36 | 48 | 36 | 48 | 60 |
| Temperature, °C. | 28 | 28 | 28 | 28 | 28 |
| Average Particle Size Diameter (microns) of Composite Pigment | <0.1 | <0.2 | <0.2 | 0.1-0.2 | <0.1 |
| 7. Separation Screening (X) | X | X | X | X | X |
| 8. Water, dilution | 200 | 200 | 200 | 300 | 300 |
| 9. Yield Aqueous Pigment Composition (dispersion) | 600 | 600 | 500 | 700 | 800 |
| B. Polymerization Step | | | | | |
| 10. Surface Active Agent** | | | | | |
| (a) Quantity, type | — | — | — | 25[6] | — |
| (b) Quantity, type | — | — | — | — | — |
| Water | 95 | — | — | 75 | — |
| Acetic Acid | — | — | — | — | — |
| Ammonium Hydroxide 28% | 5 | — | — | — | — |
| 11a. Monomer Material Non Crosslinking | | | | | |
| Styrene | 48 | — | 60 | 40 | 80 |
| Methylmethacrylate | 10 | 40 | — | 20 | — |
| Dimethylaminoethylmethacrylate | 2 | 2 | 2 | — | — |
| 4-vinylpyridine | — | — | — | 5 | — |
| 11b. Monomer Material Crosslinking | | | | | |
| Ethyleneglycoldimethacrylate | 5 | 3 | — | — | — |
| Allylacrylate | 5 | — | — | — | — |
| Divinylbenzene 50% | — | — | 8 | 15 | 20 |
| 12. Polymerization Initiator | | | | | |
| AZDN[7] | 2 | 2 | 3 | 1 | — |
| Potassium Persulfate | — | — | — | — | 3 |
| Sodium Bisulfite | — | — | — | — | 1.5 |
| Cumene Hydroperoxide | — | — | — | 2 | — |
| 13. Polymerization Conditions | | | | | |
| Time, hours, approx. | 5 | 5 | 6 | 7 | 6 |
| Temperature, °C. | 80 | 80 | 75 | 75 | 80 |
| Conversion, approx. 100% (X) | X | X | X | X | X |
| 14. Intrachromoleucospheruloid Pigment Dispersion - Yield | 770 | 645 | 570 | 780 | 900 |
| Average Particle Size Diameter (microns) | <4.0 | <4.0 | <4.0 | <4.0 | <4.0 |
| 15. Water, dilution, approx. | 3000 | 3000 | 2500 | 3000 | 3500 |
| 16. Soft Powdering Additive | | | | | |
| Type | — | — | 20[a] | 10[b] | 10[a] 10[b] |
| 17. Coagulant Additive | c | d | e | f | g |
| Temperature, °C. approx. | 30 | 30 | 30 | 30 | 30 |
| 18. Reaction Temperature, °C. | 80 | 80 | 80 | 80 | 80 |
| 19. Reaction Time, hours, approx. | 6 | 6 | 7 | 7 | 6 |
| 20. Isolation Method | | | | | |
| Filtration and washing (X) | X | — | X | X | — |
| 21. Product Available as wet coagulum (X) | X | — | X | X | — |
| 22. Drying Method | | | | | |
| Oven | X | — | X | X | — |
| Spray | — | X | — | — | X |
| 23. Dry Intrachromoleucospheruloid Pigment - Yield (approx.) | 140 | 175 | 130 | 180 | 220 |

TABLE 7-continued

Preparation of Intrachromoleucospheruloid Pigment Composition
(Parts by weight)

| Example No. 7- | 1 | 2 | 3 | 4 | 5 |
|---|---|---|---|---|---|
| Soft Powder Form (X) | — | — | X | X | X |

Example 7-4-a This example is prepared exactly as Example 7-4 except that the 20 parts of soft powdering additive type a) are replaced by 40 parts of solvent naphtha with 10 parts of a dioctyl ester of sodium sulfosuccinic acid dissolved therein.
Example 7-4-b This example is prepared exactly as Example 7-4 except that the 20 parts of soft powdering additive type a) are replaced by 5 parts of dioctylphthalate dissolved in 30 parts of Solvesso 140.
*used as wet presscake material
**capable of effecting emulsion polymerization
[1]sodium salt of a sulfate ester of an alkylphenoxy poly(ethyleneoxy)ethanol (28% active)
[2]substituted imidazoline of tall oil (100% active)
[3]fluorochemical surface active agent (100% active)
[4]N-tallow trimethylene diamine (85% active)
[5]substituted imidazoline quaternized with benzyl chloride (100% active)
[6]octylphenoxy polyethoxy ethanol (70% active)
[7]azobisisobutyronitrile
HiSil tradename for PPG Industries precipitated silica
Excelopax tradename for National Lead Industries zirconium silicate
Micro-Cel tradename for John-Mansville calcium silicate
Cab-O-Sil tradename for Cabot Corporation pyrogenic silica
TiPure tradename for DuPont titanium dioxide pigment
Oncor tradename for National Lead Industries antimony oxide/silica pigment
[a]20% solution of diamyl sodium sulfosuccinate in Solvesso 140
[b]20% solution of di-tertiary-octyl sodium sulfosuccinate in Solvent Naphtha
[c]acetic acid
[d]NH$_4$OH
[e]acetic acid
[f]aqueous H$_2$SO$_4$
[g]NH$_4$OH

TABLE 8

Preparation of Intrachromoleucospheruloid Pigment Composition
(parts by weight)

| Example No. 8- | 1 | | 2 | |
|---|---|---|---|---|
| A. Micronizing Step | | | | |
| 1. Organic Color Pigment | | | | |
| Class | Phthalocyanine | Azo | Vat | Triphenylmethane |
| Trade Name | Heliogen Blue BG | Permagen Yellow | Indanthren Blue BC | Victoria Blue |
| Color Index Name | Blue 15 | Yellow 14 | Blue 6 | Blue 1 |
| Color Index Number | 74160 | 21095 | 69825 | 42595 |
| Pigment, dry basis | 5* | 45 | 25* | 5 |
| 2. Inorganic Pigment | | | | |
| Trade Name or Type | HiSil 233 | | HiSil 233 | |
| Pigment, dry basis | 30 | | 25 | |
| 3. Inorganic Pigment | | | | |
| Trade Name or Type | TiPure LW | | TiPure R941 Slurry | |
| Pigment, dry basis | 30 | | 30 | |
| 4. Surface Active Agent | | | | |
| Material (Trade Name) | | | | |
| Alipal CO433[1] | — | | 10 | |
| Triton X405[2] | 20 | | 10 | |
| Duomeen T[3] | 20 | | — | |
| Tamol SN[4] | — | | 2 | |
| Ammonium hydroxide 28% | — | | 10 | |
| Acetic Acid | 10 | | — | |
| 5. Water, quantity | 340 | | 383 | |
| 6. Micronizing Step | | | | |
| Method | Ball | | Sand | |
| Time, hours, approx. | 60 | | 48 | |
| Temperature, °C. | 28 | | 28 | |
| Average Particle Size Diameter (microns) of Composite Pigment | <0.2 | | 0.2–0.1 | |
| 7. Separation, Screening (X) | X | | X | |
| 8. Water, dilution | 200 | | 200 | |
| 9. Yield Aqueous Pigment Composition (dispersion) | 700 | | 700 | |
| B. Polymerization Step | | | | |
| 10. Surface Active Agent | | | | |
| (a) Quantity, type | 20[2] | | 40[1] | |
| (b) Quantity, type | 10[3] | | — | |
| Water | 65 | | 50 | |
| Ammonium hydroxide 28% | — | | 10 | |
| Acetic Acid | 5 | | — | |

TABLE 8-continued

Preparation of Intrachromoleucospheruloid Pigment Composition
(parts by weight)

| Example No. 8- | 1 | 2 |
|---|---|---|
| 11a. Monomer Material Non Crosslinking | | |
| Methylmethacrylate | 40 | 50 |
| Cyclohexylmethacrylate | 10 | — |
| 11b. Monomer Material Crosslinking | | |
| Ethyleneglycoldimethacrylate | 10 | 10 |
| 12. Polymerization Initiator | | |
| AZDN | — | 3 |
| Cumene Hydroperoxide | 3 | — |
| 13. Polymerization Conditions | | |
| Time, hours, approx. | 7 | 6 |
| Temperature, °C. | 75 | 80 |
| Conversion, approx. 100% (X) | X | X |
| 14. Intrachromoleucospheruoid Pigment Dispersion | | |
| Yield | 860 | 860 |

Example 8-1-a. This example is prepared exactly as Example 8-1 except that the 5 parts of Pigment Blue 15 are replaced by 20 parts of Pigment Green 7 and the 45 parts of Pigment Yellow 14 are replaced by 30 parts of Pigment Yellow 110.

Example 8-2-a. This example is prepared exactly as Example 8-2 except that the 25 parts of Vat Blue 6 are replaced by 25 parts of Pigment Violet 19 and the 5 parts of Pigment Blue 5 are replaced by 5 parts of Pigment Red 81.

*used as wet presscake material
**capable of effecting emulsion polymerization
[1]sodium salt of a sulfate ester of an alkylphenoxy poly(ethyleneoxy)ethanol (28% active)
[2]octylphenoxy olyethoxy ethanol (70% active)
[3]N-tallow trimethylene diamine (85% active)
[4]sodium salt of a condensed naphthaline sulfonic acid
[5]azobisisobutyronitrile
HiSil tradename for PPG Industries precipitated silica
TiPure tradename for DuPont titanium dioxide pigment

TABLE 9

Preparation of Intrachromoleucospheruloid Pigment Composition
(parts by weight)

| Example No. 9- | 1 | 2 | 3 | 4 | 5 |
|---|---|---|---|---|---|
| A. Micronizing Step | | | | | |
| 1. Organic Color Pigment | | | | | |
| Class | Phthalocyanine | Vat | Azo | Quinacridone | Cond. Azo |
| Trade Name | Heliogen Green A | Brilliant Orange RK | Permant Carmine | Monastral Red B | Chromoptal Red BR |
| Color Index Name | Green 7 | Orange 7 | Red 5 | Violet 19 | — |
| Color Index Number | 74260 | 71105 | 12490 | 46500 | |
| Pigment, dry basis | 20* | 30* | 35 | 15 | 25 |
| 2. Inorganic Pigment | | | | | |
| Trade Name | Paper Grade Silica (Wet) | Reinforcing Grade Silica (Wet) | Aerosil 300 | Reinforcing Grade Silica (Wet) | Paper Grade Silica (Wet) |
| Pigment, dry basis | 40 | 50 | 50 | 30 | 30 |
| 3. Inorganic Pigment | | | | | |
| Trade Name | — | — | — | TiPure R941 Slurry | Unitane 0310 Dispersion |
| Pigment, dry basis | — | — | — | 30 | 30 |
| 4. Surface Active Agent** Material (Trade Name) | | | | | |
| Alipal CO433[1] | 38 | — | 18 | — | — |
| Triton X405[2] | — | 38 | 10 | 28 | 38 |
| Monazoline T[3] | 2 | — | — | — | 2 |
| Tetraethylenepentamine | — | 2 | 2 | — | — |
| Monaquat TIBC[4] | — | — | — | 2 | — |
| Ammonium Hydroxide 28% | 2 | 2 | 2 | 2 | 2 |
| 5. Water, quantity | 498 | 578 | 583 | 493 | 573 |
| 6. Micronizing Step | | | | | |
| Method | Sand | Sand | Sand | Sand | Sand |
| Time, hours, approx. | 48 | 48 | 48 | 48 | 48 |
| Temperature, °C. | 28 | 28 | 28 | 28 | 28 |
| Average Particle Size Diameter (microns) of Composite Pigment | <0.2 | <0.2 | <0.2 | <0.2 | <0.2 |
| 7. Separation, Screening (X) | X | X | X | X | X |
| 8. Water, dilution | 300 | 200 | 200 | 300 | 300 |
| 9. Aqueous Pigment Composition | | | | | |

TABLE 9-continued

Preparation of Intrachromoleucospheruloid Pigment Composition
(parts by weight)

| Example No. 9- | 1 | 2 | 3 | 4 | 5 |
|---|---|---|---|---|---|
| (Dispersion) Yield | 900 | 900 | 900 | 900 | 1000 |
| B. Polymerization Step | | | | | |
| 10. Surface Active Agent** | | | | | |
| (a) Quantity, type | — | — | 20[2] | 20[2] | 10[2] |
| (b) Quantity, type | — | — | — | — | — |
| Water | — | — | — | — | — |
| Ammonium Hydroxide 28% | 10 | 10 | 10 | 10 | 10 |
| 11a. Monomer Material Non Crosslinking | | | | | |
| Styrene | 80 | — | 40 | 20 | 40 |
| Methylmethacrylate | — | 75 | 20 | 25 | 20 |
| 4-cinylpyridine | 15 | — | 10 | 5 | — |
| Dimethylaminoethylmethacrylate | — | 15 | — | 10 | 20 |
| 11b. Monomer Material Crosslinking | | | | | |
| Ethyleneglycoldimethacrylate | 5 | 10 | 10 | — | — |
| 50% Divinylbenzene | 5 | — | — | 20 | 20 |
| 12. Polymerization Initiator | | | | | |
| AZDN[5] | — | 3 | 3 | 3 | 3 |
| Cumene Hydroperoxide | 3 | — | — | — | — |
| 13. Polymerization Conditions | | | | | |
| Time, hours, approx. | 6 | 6 | 7 | 6 | 6 |
| Temperature, °C. | 80 | 75 | 80 | 75 | 75 |
| Conversion, approx 100% (X) | X | X | X | X | X |
| 14. Intrachromoleucospheruloid Pigment Dispersion - yield | 1015 | 1010 | 1010 | 1010 | 1120 |
| Average Particle Size Diameter (microns) | <4.0 | <4.0 | <4.0 | <4.0 | <4.0 |

*used as wet presscake material
**capable of effecting emulsion polymerization
[1]sodium salt of a sulfate ester of an alkylphenoxy poly(ethyleneoxy)ethanol (28% active)
[2]octylphenoxy polyethoxy ethanol (70% active)
[3]substituted imidazoline of tall oil (100% active)
[4]substituted imidazoline quaternized with benzyl chloride (100% active)
[5]azobisisobutyronitrile
Aerosil tradename for Degussa Company pyrogenic silica
TiPure tradename for DuPont titanium dioxide pigment
Unitane tradename for American Cyanamid titanium dioxide pigment

TABLE 10

Preparation of Intrachromoleucospheruloid Pigment Composition
(parts by weight)

| Example No. 10- | 1 | 2 | 3 | 4 | 5 |
|---|---|---|---|---|---|
| A. Micronizing Step | | | | | |
| 1. Organic Color Pigment | | | | | |
| Class | Vat | Phthalocyanine | Azamethine | Quinacridone | Dioxazine |
| Trade Name | Perylene Red | Heliogen Blue BG | Iragazin Yellow 3RLT | Magenta | Carbazole Violet |
| Color Index Name | Red 29 | Blue 15 | Yellow 110 | Red 122 | Violet 23 |
| Color Index Number | 71140 | 74160 | — | — | — |
| Pigment, dry basis | 20 | 25* | 25 | 20 | 15* |
| 2. Inorganic Pigment | | | | | |
| Type or Trade Name | | HiSil 233 | HiSil 404 | HiSil 233 | HiSil 233 |
| Pigment, dry basis | — | 30 | 20 | 20 | 20 |
| 3. Inorganic Pigment | | | | | |
| Type | Titanium Dioxide Type 1[a] | Titanium Dioxide Type 2[b] | Titanium Dioxide Type 3[c] | Titanium Dioxide Type 4[d] | Titanium Dioxide Type 5[e] |
| Pigment, dry basis | 40 | 40 | 30 | 30 | 30 |
| 4. Surface Active Agent** Material (Trade Name) | | | | | |
| Duomeen T[1] | 20 | — | 2 | — | 20 |
| Monaquat TIBC[2] | — | 20 | — | — | — |
| Monazoline T[3] | — | — | — | — | — |
| Triton X400[4] | 10 | — | — | — | 10 |
| Triton X405[5] | — | — | 20 | 20 | 10 |
| Acetic Acid | 10 | — | — | — | — |
| Ammonium Hydroxide 28% | — | — | 5 | 5 | — |
| 5. Water, quantity | 500 | 485 | 498 | 405 | 495 |
| 6. Micronizing Step | | | | | |
| Method | Sand | Sand | Ball | Sand | Ball |
| Time, hours, approx. | 48 | 48 | 60 | 36 | 40 |

TABLE 10-continued

Preparation of Intrachromoleucospheruloid Pigment Composition
(parts by weight)

| Example No. 10- | 1 | 2 | 3 | 4 | 5 |
|---|---|---|---|---|---|
| Temperature, °C. | 28 | 28 | 28 | 28 | 28 |
| Average Particle Size Diameter (microns) of Composite Pigment | <0.1 | <0.02 | <0.2 | <0.2 | <0.2 |
| 7. Separation, Screening (X) | X | X | X | X | X |
| 8. Water, dilution | 200 | 300 | 200 | 250 | 200 |
| 9. Yield, Aqueous Pigment Composition (dispersion) | 800 | 900 | 800 | 750 | 800 |
| B. Polymerization Step | | | | | |
| 10. Surface Active Agent** | | | | | |
| (a) Quantity, type | 20[2] | 25[1] | 35[5] | 35[5] | 20[1] |
| (b) Quantity, type | — | — | — | — | 10[4] |
| Water | 75 | 65 | 55 | 55 | 60 |
| Ammonium Hydroxide 28% | — | — | 10 | 10 | — |
| Acetic Acid | 5 | 10 | — | — | 10 |
| 11a. Monomer Material Non Crosslinking | | | | | |
| Styrene | 20 | — | 20 | — | 60 |
| Methylmethacrylate | 20 | 40 | — | 20 | — |
| Dimethylaminoethylmethacrylate | 2 | — | 2 | — | 2 |
| Cyclohexylmethacrylate | 20 | 10 | 20 | 10 | 10 |
| 11b. Monomer Material Crosslinking | | | | | |
| Ethyleneglycoldimethacrylate | 10 | 5 | 5 | 5 | 5 |
| Allylacrylate | — | 5 | — | — | 5 |
| 12. Polymerization Initiator | | | | | |
| AZDN[6] | 3 | — | 2 | 2 | 4 |
| Cumene Hydroperoxide | — | 3 | — | — | — |
| 13. Polymerization Conditions | | | | | |
| Time, hours, approx. | 6 | 7 | 6 | 6 | 7 |
| Temperature, °C. | 75 | 80 | 75 | 75 | 85 |
| Conversion, approx. 100% (X) | X | X | X | X | X |
| 14. Intrachromoleucospheruloid Pigment Dispersion-yield | 972 | 1060 | 947 | 885 | 982 |
| Average Particle Size, Diameter (microns) | <4.0 | <4.0 | <4.0 | <4.0 | <4.0 |

Example 10-2-a. This example is made exactly as Example 10-2 except that the 30 parts of HiSil 233 are replaced by 30 parts of a wet precipitated reinforcing grade silica containing 2% of a cationic amine compound such as Armac T (Armour Chemical Company) slurried up therewith.

Example 10-3-a. This example is made exactly as Example 10-3 except that the 30 parts of HiSil 404 are replaced by 30 parts of a wet precipitated paper grade silica containing 2% of a water soluble polyamine i.e. tetraethylenepentamine slurried up therewith.

Example 10-4-a. This example is made exactly as Example 10-4 except that the 30 parts of titanium dioxide pigment type[d] are replaced by 30 parts of titanium dioxide pigment type[f].

*used as wet presscake material
**capable of effecting emulsion polymerization
[1]N-tallow trimethylene diamine (85% active)
[2]substituted imidazoline quaternized with benzyl chloride (100% active)
[3]substituted imidazoline of tall oil (100% active)
[4]stearyl dimethyl benzyl ammonium chloride (82% active)
[5]octylphenoxy polyethoxy ethanol (70% active)
[6]azobisisobutyronitrile
HiSil tradename for PPG Industries precipitated silica

[a]Titanium dioxide pigment that has been slurried up in aqueous dispersion with sufficient "N" type sodium silicate to produce on acidification a titanium dioxide pigment composition containing 30% by weight of precipitated silica thereon.

[b]Titanium dioxide pigment that has been slurried up in aqueous dispersion with sufficient titanium tetrachloride added so that the resulting titanium dioxide pigment composition contains 10% by weight of freshly precipitated titanium dioxide thereon.

[c]Titanium dioxide pigment that has been slurried up in aqueous dispersion with an aqueous dispersion of an aqueous resin solution comprising equal molecular proportions of resorcinol and formaldehyde so that the resulting titanium dioxide pigment composition contains 15% by weight of the resorcinol/formaldehyde resin precipitated thereon.

[d]Titanium dioxide pigment that has been slurried up in aqueous dispersion with an aqueous resin solution comprising equal molecular proportions of urea and formaldehyde so that the resulting titanium dioxide pigment composition contains 20% by weight of the urea/formaldehyde resin precipitated thereon.

[e]Titanium dioxide pigment that has been slurried up in aqueous dispersion with a water soluble organo silicon compound, i.e. Dow Corning Z-6020 silane in sufficient quantity to provide a resulting titanium dioxide pigment containing 2% by weight of the organo silane thereon.

[f]Titanium dioxide pigment that has been slurried up in aqueous dispersion with a sufficient amount of a water dispersible polyethyleneimine, i.e. Polyethylenimine 1800 to yield a resulting titanium dioxide pigment composition containing 5% by weight of the polyethylenimine precipitated thereon.

TABLES 11-20

Preparation of Intrachromoleucospheruloid Pigment Material using Noncross-linked Polymer Material

TABLE 11

| | Preparation of Intrachromoleucospheruloid Pigment Composition (parts by weight) | | | | |
|---|---|---|---|---|---|
| Example No. 11- | 1 | 2 | 3 | 4 | 5 |
| A. Micronizing Step | | | | | |
| 1. Organic Color Pigment | | | | | |
| Class | Triphenyl-methane | Vat | Quinacridone | Azo Pigment | Phthalo-cyanine |
| Trade Name | Victoria Blue | Indanthrene Red FBBA | Magenta | Carmine FFY | Heliogen Viridine Y |
| Color Index Name | Blue 1 | Red 10 | Red 122 | Red 5 | Green 36 |
| Color Index Number | 42595 | 6700[0] | — | 12490 | 74160 |
| Pigment, dry basis | 2 | 50 | 25* | 30* | 15* |
| 2. Inorganic Pigment | | | | | |
| Trade Name | HiSil 404 | Cab-O-Sil H5 | HiSil 233 | Excelopax Zirconium Silicate | — |
| Pigment, dry basis | 80 | 0.25 | 30 | 50 | — |
| 3. Inorganic Pigment | | | | | |
| Trade Name | Unitane OR450 | TiPure LW | Titanox RA | — | TiPure R941 Slurry |
| Pigment, dry basis | 8 | 0.25 | 40 | — | 40 |
| 4. Surface Active Agent** Material, Trade Name | | | | | |
| Triton X405[1] | 10 | — | — | 10 | — |
| Triton X305[2] | 10 | — | — | 10 | — |
| Alipal C0433[3] | — | 10 | 30 | 10 | — |
| Monaquat TIBC[4] | 2 | 1 | — | 1 | 30 |
| Zonyl FSB[5] | 1 | 0.5 | — | 1 | 1 |
| Ammonium Hydroxide 28% | 10 | — | 10 | 5 | — |
| Acetic Acid | — | 5 | — | — | 10 |
| 5. Water, quantity | 377 | 333 | 365 | 383 | 304 |
| 6. Micronizing Step | | | | | |
| Method | Sand | Sand | Sand | Sand | Ball |
| Time, hours, approx. | 36 | 48 | 36 | 36 | 60 |
| Temperature, °C. | 28 | 28 | 28 | 28 | 28 |
| Average Particle size, Diameter (microns) of Composite Pigment | <0.2 | <0.2 | <0.2 | <0.2 | <0.2 |
| 7. Separation, Screening (X) | X | X | X | X | X |
| 8. Water, dilution | 500 | 200 | 300 | 300 | 300 |
| 9. Yield Aqueous Pigment Composition (Dispersion) | 1000 | 600 | 800 | 800 | 700 |
| B. Polymerization Step | | | | | |
| 10. Surface Active Agent** | | | | | |
| (a) Quantity, type | 110[1] | 40[1] | 70[3] | 30[1] | 20[1] |
| (b) Quantity, type | 30[3] | 20[3] | — | — | 20[4] |
| Water | 50 | 35 | 20 | 70 | 50 |
| Acetic Acid | — | 5 | — | — | 10 |
| Ammonium Hydroxide 28% | 10 | — | 10 | — | — |
| 11. Monomer Material | | | | | |
| Styrene | 400 | 30 | 100 | 50 | 30 |
| Methylmethacrylate | 380 | 60 | — | — | 50 |
| Dimethylaminoethylmethacrylate | 20 | 10 | — | — | — |
| 4-Vinylpyridine | — | — | 20 | 10 | — |
| Acrylonitrile | — | — | — | 30 | — |
| Acrylic Acid | — | — | — | — | 10 |
| 12. Polymerization Initiator | | | | | |
| AZDN[6] | — | 3 | — | 3 | 4 |
| Potassium Persulfate | 30 | — | 3 | — | — |
| Sodium Bisulfate | 15 | — | 1.5 | — | — |
| 13. Polymerization Conditions | | | | | |
| Time, hours, approx. | 10 | 6 | 6 | 6 | 6 |
| Temperature, °C. | 60 | 80 | 65 | 80 | 65 |
| Conversion, approx. 100% (X) | X | X | X | X | X |
| 14. Intrachromoleucospheruloid Pigment Dispersion Yield | 2000 | 800 | 1020 | 990 | 890 |
| Average Particle Size, | | | | | |

TABLE 11-continued

Preparation of Intrachromoleucospheruloid Pigment Composition
(parts by weight)

| Example No. 11- | 1 | 2 | 3 | 4 | 5 |
|---|---|---|---|---|---|
| Diameter (microns) | <4.0 | <4.0 | <4.0 | <4.0 | <4.0 |

*used as wet presscake material
**capable of effecting emulsion polymerization
HiSil tradename for PPG Industries precipitated silica
Cab-O-Sil tradename for Cabot Corporation pyrogenic silica
Excelopax tradename for National Lead Industries zirconium silicate
Unitane tradename for American Cyanamid Company titanium dioxide pigment
TiPure tradename for DuPont titanium dioxide pigment
Titanox tradename for National Lead Industries titanium dioxide pigment
[1]octylphenoxy polyethoxy ethanol (70% active)
[2]octylphenoxy polyethoxy ethanol (70% active)
[3]sodium salt of a sulfate ester of an alkylphenoxy poly(ethyleneoxy)ethanol (28% active)
[4]substituted imidazoline quaternized with benzyl chloride (100% active)
[5]fluorochemical surface active agent
[6]azobisisobutyronitrile

TABLE 12

Preparation of Intrachromoleucospheruloid Pigment Composition
(parts by weight)

| Example No. 12- | 1 | 2 | 3 | 4 | 5 |
|---|---|---|---|---|---|
| A. Micronizing Step | | | | | |
| 1. Organic Color Pigment | | | | | |
| Class | Azamethine | Vat | Phthalocyanine | Dioxazine | Misc. |
| Trade Name | Irgazin Yellow 2GLT | Perylene Red | Polymon Blue G | Heliogen Violet | Naphtol Green B |
| Color Index Name | Yellow 109 | Red 29 | Blue 16 | Violet 23 | Green 8 |
| Color Index Number | — | 71140 | 74100 | 51319 | 10006 |
| Pigment, dry basis | 25 | 30 | 25 | 15* | 30 |
| 2. Inorganic Pigment | | | | | |
| Trade Name | HiSil 404 | Micro-Cel T-38 | A-Sil-Ate W | Cab-O-Sil M-5 | Santocel 62 |
| Pigment, dry basis | 20 | 40 | 30 | 25 | 40 |
| 3. Inorganic Pigment | | | | | |
| Trade Name | TiPure LW | — | — | — | — |
| Pigment, dry basis | 20 | — | — | — | — |
| 4. Surface Active Agent** | | | | | |
| Material (Trade Name) | | | | | |
| Triton X400[1] | — | — | — | 25 | — |
| Triton X405[2] | 80 | — | 40 | — | 30 |
| Ducmeen T[3] | — | 20 | — | — | — |
| Monazoline T[4] | 1 | — | 1 | — | 1 |
| Ammonium Hydroxide 28% | 10 | — | — | — | — |
| Acetic Acid | — | 10 | 5 | 10 | 2 |
| 5. Water, quantity | 345 | 400 | 399 | 325 | 397 |
| 6. Micronizing Step | | | | | |
| Method | Sand | Ball | Sand | Ball | Sand |
| Time, hours, approx. | 48 | 48 | 36 | 60 | 48 |
| Temperature, °C. | 28 | 28 | 28 | 28 | 28 |
| Average Particle, Size, Diameter (microns) of Composite Pigment | <0.2 | <0.1 | <0.02 | <0.02 | <0.1 |
| 7. Separation, Screening (X) | X | X | X | X | X |
| 8. Water, dilution | 300 | 300 | 300 | 300 | 300 |
| 9. Yield Aqueous Pigment Composition (Disperions) | 800 | 800 | 800 | 700 | 800 |
| B. Polymerization Step | | | | | |
| 10. Surface Active Agent** | | | | | |
| (a) Quantity, type | 200[2] | 20[3] | 20[2] | 25[1] | 50[2] |
| (b) Quantity, type | — | 10[4] | — | 10[4] | — |
| Water | — | 60 | 80 | 55 | 50 |
| Acetic Acid | — | 10 | — | 10 | — |
| Ammonium Hydroxide 28% | 20 | — | — | — | — |
| 11. Monomer Material | | | | | |
| Styrene | 19 | 40 | — | 78 | 60 |
| Methylmethacrylate | — | 20 | 50 | — | — |
| Cyclohexylmethacrylate | — | 20 | 20 | — | 18 |
| Dimethylaminoethylmethacrylate | 1 | — | — | 2 | 2 |
| 12. Polymerization Initiator | | | | | |
| AZDM[5] | 1 | 3 | 3 | 3 | 3 |
| Cumene Hydroperoxide | 2 | — | — | — | — |
| 13. Polymerization Conditions | | | | | |
| Time, hours, approx. | 4 | 5 | 6 | 6 | 5 |
| Temperature, °C. | 80 | 80 | 75 | 75 | 80 |
| Conversion, approx. 100% (X) | X | X | X | X | X |

TABLE 12-continued

Preparation of Intrachromoleucospheruloid Pigment Composition
(parts by weight)

| Example No. 12- | 1 | 2 | 3 | 4 | 5 |
|---|---|---|---|---|---|
| 14. Intrachromoleucospheruloid Pigment Dispersion | | | | | |
| Yield | 1040 | 980 | 970 | 880 | 980 |
| Average Particle Size, Diameter (microns) | <4.0 | <4.0 | <4.0 | <4.0 | <4.0 |

*used as wet presscake material
*capable of effecting emulsion polymerization
HiSil tradename for PPG Industries precipitated silica
Micro-Cel tradename for Johns-Mansville calcium silicate
A-Sil-Ate tradename for Freeport Kaolin company aluminum silicate
Cab-O-Sil tradename for Cabot Corporation pyrogenic silica
Santocel tradename for Monsanto Corporation aerogel silica
TiPure tradename for DuPont titanium dioxide pigment
[1]stearyl dimethyl benzyl ammonium chloride (82% active)
[2]octylphenoxy polyethoxy ethanol (70% active)
[3]N-tallow trimethylene diamine (85% active)
[4]substituted imidazoline of tall oil (100% active)
[5]azobisisobutyronitrile

TABLE 13

Preparation of Intrachromoleucospheruloid Pigment Composition
(parts by weight)

| Example No. 13- | 1 | 2 | 3 | 4 | 5 |
|---|---|---|---|---|---|
| A. Micronizing Step | | | | | |
| 1. Organic Color Pigment | | | | | |
| Class | Vat | Azamethine | Quinacridone | Phthalocyanine | Azo |
| Trade Name | Ponsol Jade Green | Irgazin Orange RLT | Monastral Red Y | Heliogen Green B | Hansa Yellow 3R |
| Color Index Name | Green 1 | Orange 42 | Violet 19 | Green 7 | Orange 1 |
| Color Index Number | 59825 | — | 46500 | 74260 | 11725 |
| Pigment, dry basis | 30* | 30 | 25 | 30* | 35 |
| 2. Inorganic Pigment | | | | | |
| Trade Name | HiSil 404 | TiPure R941 Slurry | Unitane OR 450 | Titanox RA47 | Horsehead R771 |
| Pigment, dry basis | 40 | 30 | 30 | 40 | 40 |
| 3. Inorganic Pigment | | | | | |
| Trade Name | Cab-O-Sil H5 | HiSil EP | HiSil 233 | — | — |
| Pigment, dry basis | 20 | 20 | 20 | — | — |
| 4. Surface Active Agent** Material, Trade Name | | | | | |
| Alipal C0433[1] | 90 | 10 | — | — | — |
| Triton X405[2] | — | 50 | 40 | — | 10 |
| Ducmeen T[3] | — | — | — | 25 | 20 |
| Monazoline T[4] | 2 | — | 2 | — | — |
| Zonyl FBA[5] | 1 | — | 1 | — | — |
| Zonyl FBC[6] | — | — | — | 1 | 1 |
| Ammonium hydroxide 28% | 10 | 10 | 5 | — | — |
| Acetic Acid | — | — | — | 12 | 10 |
| 5. Water, Quantity | 407 | 350 | 377 | 392 | 384 |
| 6. Micronizing Step | | | | | |
| Method | Sand | Sand | Sand | Ball | Ball |
| Time, Hours, approx. | 48 | 48 | 48 | 60 | 60 |
| Temperature, °C. | 28 | 28 | 28 | 28 | 28 |
| Average Particle Size Diameter (microns) of Composite Pigment | <0.1 | <0.2 | <0.1 | <0.02 | <0.1 |
| 7. Separation, Screening (X) | X | X | X | X | X |
| 8. Water, dilution | 300 | 300 | 300 | 200 | 200 |
| 9. Yield Aqueous Pigment Composition (Dispersion) | 900 | 800 | 800 | 700 | 700 |
| B. Polymerization Step | | | | | |
| 10. Surface Active Agent** | | | | | |
| (a) Quantity, type | 20[2] | 25[1] | 25[1] | 25[3] | 45[2] |
| (b) Quantity, type | — | — | 20[2] | — | 15[4] |
| Water | 25 | 25 | 15 | 63 | 30 |
| Acetic Acid | — | — | — | 12 | 10 |
| Ammonium Hydroxide 28% | 5 | 10 | 10 | — | — |
| 11. Monomer Material | | | | | |
| Styrene | — | 60 | — | 35 | 50 |
| Methylmethacrylate | — | 15 | 40 | 20 | — |
| Acrylcaitrile | — | 10 | — | 10 | 10 |
| Vinyltoluene | 75 | — | — | — | — |
| 4-Vinylpyridine | 5 | 5 | — | — | — |
| Methyacrylic Acid | — | — | 5 | — | — |

TABLE 13-continued

Preparation of Intrachromoleucospheruloid Pigment Composition
(parts by weight)

| Example No. 13- | 1 | 2 | 3 | 4 | 5 |
|---|---|---|---|---|---|
| 12. Polymerization Initiator | | | | | |
| ALDN[7] | 3 | 3 | 2 | — | 3 |
| Cumene Hydroperoxide | — | — | 2 | 3 | — |
| 13. Polymerization Conditions | | | | | |
| Time, hours, approx. | 7 | 6 | 6 | 7 | 5 |
| Temperature, °C. | 75 | 80 | 80 | 75 | 85 |
| Conversion, approx. 100% (X) | X | X | X | X | X |
| 14. Intrachromoleucospheruloid | | | | | |
| Pigment Dispersion-yield | 1030 | 950 | 910 | 870 | 860 |
| Average Particle Size | | | | | |
| Diameter (microns) | <4.0 | <4.0 | <4.0 | <4.0 | <4.0 |

*used as wet presscake material
**capable of effecting emulsion polymerization
HiSil tradename for PPG Industries precipitated silica
Cab-O-Sil tradename for Cabot Corporation pyrogenic silica
TiPure tradename for DuPont titanium dioxide pigment
Unitane tradename for American Cyanamid Company titanium dioxide pigment
Titanox tradename for National Lead Industries titanium dioxide pigment
Horsehead tradename for New Jersey Zinc Company titanium dioxide pigment
[1]sodium salt of a sulfate ester of an alkylphenoxy poly(ethyleneoxy)ethanol(28% active)
[2]catylphenoxy polyethoxy ethanol (70% active)
[3]N-tallow trimethylene diamine (85% active)
[4]substituted imidazoline of tall oil (100% active)
[5]fluorochemical surface active agent (50% active)
[6]fluorochemical surface active agent (50% active)
[7]azobisisobutyronitrile

TABLE 14

Preparation of Intrachromoleucospheruloid Pigment Composition
(parts by weight)

| Example No. 14- | 1 | 2 | 3 | 4 | 5 |
|---|---|---|---|---|---|
| A. Micronizing Step | | | | | |
| 1. Organic Color Pigment | | | | | |
| Class | Phthalocyanine | Cond. Azo | Dioxazine | Vat | Azomethine |
| Trade Name | Heliogen Blue BG | Chromoptal Red BR | Irgazin Violet 6 RLT | Sandothrene Blue NCCD | Irgazin RED 2 BLT |
| Color Index Name | Blue 15 | — | — | Blue 14 | Red 180 |
| Color Index Number | 74160 | — | — | 69810 | — |
| Pigment, dry basis | 20* | 30 | 20 | 35 | 30 |
| 2. Inorganic Pigment | | | | | |
| Trade Name | Tronex CR800 | Unitane OR640 | TiPure R960 | Unitane OR520 | Barium Sulfate* Pigment White 5 |
| Pigment, dry basis | 30 | 40 | 30 | 40 | 20 |
| 3. Inorganic Pigment | | | | | |
| Trade Name | Zinc Oxide Pigment White 4 | Cab-O-Sil H5 | HiSil 404 | Silene EF | TiPure R941 Slurry |
| Pigment, dry basis | 15 | 20 | 20 | 20 | 30 |
| 4. Surface Active Agent** | | | | | |
| Material, Trade Name | | | | | |
| Alipal C0433[1] | 20 | — | — | — | 30 |
| Triton X405[2] | 20 | 10 | 20 | — | 10 |
| Duomac T[3] | — | 20 | — | 40 | — |
| Monaquat TIBO[4] | 2 | — | 20 | — | 2 |
| Zonyl FSB[5] | — | 1 | — | — | 1 |
| Tamol SW[6] | 2 | — | — | — | — |
| Ammonium Hydroxide 28% | 10 | — | — | — | — |
| Acetic Acid | — | 10 | 10 | 20 | — |
| 5. Water, quantity | 381 | 370 | 380 | 395 | 377 |
| 6. Micronizing Step | | | | | |
| Method | Sand | Ball | Ball | Ball | Sand |
| Time, hours, approx. | 48 | 60 | 48 | 60 | 48 |
| Temperature, °C. | 28 | 28 | 28 | 28 | 28 |
| Average Particle Size, Diameter (microns) of Composite Pigment | <0.1 | <0.1 | <0.1 | <0.2 | <0.2 |
| 7. Separation, Screening (X) | X | X | X | X | X |
| 8. Water, dilution | 300 | 300 | 200 | 250 | 300 |
| 9. Yield Aqueous Pigment Composition (dispersion) | 800 | 700 | 700 | 800 | 800 |
| B. Polymerization Step | | | | | |
| 10. Surface Active Agent** | | | | | |
| (a) Quantity, type | 90[1] | 20[2] | 20[2] | 40[2] | 50[1] |

TABLE 14-continued

Preparation of Intrachromoleucospheruloid Pigment Composition
(parts by weight)

| Example No. 14- | 1 | 2 | 3 | 4 | 5 |
|---|---|---|---|---|---|
| (b) Quantity, type | — | 20[3] | 30[4] | 20[4] | 20[2] |
| Water | — | 50 | 40 | 30 | 20 |
| Acetic Acid | — | 10 | 10 | 10 | — |
| Ammonium Hydroxide 28% | 10 | — | — | — | 10 |
| 11. Monomer Material | | | | | |
| Methylmethacrylate | 60 | — | 40 | — | 50 |
| Styrene | 22 | 50 | 40 | 35 | 40 |
| Dimethylaminoethylmethacrylate | 8 | — | — | — | — |
| Cyclohexylmethacrylate | — | 10 | — | 20 | — |
| 4-vinylpyridine | — | — | — | 5 | — |
| Methacrylic Acid | — | — | — | — | 10 |
| 12. Polymerization Initiator | | | | | |
| AZDM[7] | 3 | — | 3 | — | 3 |
| Potassium Persulfate | — | 2.5 | — | 2.5 | — |
| Sodium Risulfite | — | 1.25 | — | 1.25 | — |
| 13. Polymerization Conditions | | | | | |
| Time, hours, approx. | 5 | 6 | 5 | 6 | 5 |
| Temperature, °C. | 80 | 60 | 80 | 65 | 75 |
| Conversion, approx. 100% (X) | X | X | X | X | X |
| 14. Intrachromoleucospheruloid | | | | | |
| Pigment Dispersion-yield | 990 | 860 | 880 | 960 | 1000 |
| Average Particle Size | | | | | |
| Diameter (microns) | <4.0 | <4.0 | <4.0 | <4.0 | <4.0 |

Example 14-1-a. This example is prepared exactly as in Example 14-1 except that 30 parts of titanium dioxide, Tronex CR800 are replaced by 30 parts of a natural silica pigment, Min-U-Sil (product of PGS).
Example 14-2-a. This example is prepared exactly as in Example 14-2 except that 20 parts of Cab-O-Sil H5 are replaced by 20 parts of zirconium silicate "Excelopax" produced by NL. Tam. Div.)
Example 14-2-b. This example is prepared exactly as in Example 14-2 except that the 20 parts of Unitane OR640 are replaced by 20 parts of Zirconium Oxide, pigment white 12 (manufactured by NL. Tam. Div.)
Example 14-2-c. This example is prepared exactly as in Example 14-2 except that the 20 parts of Cab-O-Sil H5 are replaced by 20 parts of alumina hydrate (manufactured by Alcoa).
Example 14-5-a. This example is prepared exactly as in Example 14-5 except that the 20 parts of Barium Sulfate Pigment White 5 are replaced by 20 parts of Celite 110, a natural silica pigment (manufactured by Johns-Mansville Company).
Example 14-5-b. This example is prepared exactly as in Example 14-5 except that the 20 parts of Barium Sulfate, Pigment White 5, are replaced by 20 parts of Pigment White 20, Aluminum Potassium Silicate.
*used as wet presscake material
**capable of effecting emulsion polymerization
Tronex tradename for Kerr-McGee Company titanium dioxide pigment
Unitene tradename for American Cyanamid Company titanium dioxide pigment
TiPure tradename for DuPont titanium dioxide pigment
Cab-O-Sil tradename for Cabot Corporation pyrogenic silica
Silene EF tradename for PPG Industries precipitated silica, calcium modified
HiSil tradename for PPG Industries precipitated silica
[1]sodium salt of a sulfate ester of an alkylphenoxy poly(ethyleneoxy)ethanol (28% active)
[2]octylphenoxy polyethoxy ethanol (70% active)
[3]H-tallow trimethylene diamine diacetate (85% active)
[4]substituted imidazoline quaternized with benzyl chloride (100% active)
[5]fluorochemical surface active agent (50% active)
[6]sodium salt of a condensed naphthalene sulfonic acid
[7]azobisisobutyronitrile

TABLE 15

Preparation of Intrachromoleucospheruloid Pigment Composition
(parts by weight)

| Example No. 15- | 1 | 2 | 3 | 4 | 5 |
|---|---|---|---|---|---|
| A. Micronizing Step | | | | | |
| 1. Organic Color Pigment | | | | | |
| Class | Phthalo-cyanine | Phthalo-cyanine | Vat | Vat | Azamethine |
| Trade Name | Viridine Ex. Y | Polymon Blue G | Indanthrene Pink R | Indanthrene Rubine R | Yellow 2 GLT |
| Color Index Name | Green 41 | Blue 16 | Red 1 | Red 13 | Yellow 109 |
| Color Index Number | — | 74100 | 73360 | 70320 | — |
| Pigment, dry basis | 25* | 30 | 30* | 35 | 25 |
| 2. Inorganic Pigment | | | | | |
| Trade Name | Celite 281 | Micro-Cel T70 | Al-Sil-Ate H0 | Excelopax Zirconium silicate | Baroid Macaloid |
| Pigment, dry basis | 20 | 30 | 40 | 40 | 10 |
| 3. Inorganic Pigment | | | | | |
| Trade Name | Titanox RA | Unitane OR220 | TiPure R941 | TiPure R900 | Titanox RA |
| Pigment, dry basis | 30 | 40 | 40 | 50 | 30 |
| 4. Surface Active Agent** | | | | | |
| Material, Trade Name | | | | | |
| Triton X305[1] | 20 | — | 10 | — | — |
| Triton X400[2] | — | 20 | — | 20 | — |
| Triton X405[3] | 20 | 20 | 30 | — | 20 |
| Tamol SN[4] | 2 | — | 1 | — | — |

TABLE 15-continued

Preparation of Intrachromoleucospheruloid Pigment Composition (parts by weight)

| Example No. 15- | 1 | 2 | 3 | 4 | 5 |
|---|---|---|---|---|---|
| Monazoline T[5] | 2 | — | 1 | 20 | 1 |
| Ammonium Hydroxide 28% | — | — | — | — | |
| Acetic Acid | — | 5 | 5 | 10 | |
| 5. Water, quantity | 331 | 335 | 343 | 325 | 309 |
| 6. Micronizing Step | | | | | |
| Method | Sand | Sand | Sand | Ball | Sand |
| Time, hours, approx. | 36 | 24 | 36 | 60 | 48 |
| Temperature, °C. | 28 | 28 | 28 | 28 | 28 |
| Average Particle Size Diameter (microns) of Composite Pigment | <0.1 | <0.1 | <0.2 | <0.1 | <0.2 |
| 7. Separation, Screening (X) | X | X | X | X | X |
| 8. Water, dilution | 250 | 200 | 200 | 200 | 200 |
| 9. Yield Aqueous Pigment Composition (dispersion) | 700 | 700 | 700 | 700 | 600 |
| B. Polymerization Step | | | | | |
| 10. Surface Active Agent** | | | | | |
| (a) Quantity, type | — | 20[3] | — | 20[5] | 40[3] |
| (b) Quantity, type | — | — | — | — | — |
| Water | — | 20 | — | 70 | 35 |
| Acetic Acid | — | 10 | — | 10 | — |
| Ammonium Hydroxide 28% | 10 | — | — | — | 25 |
| 11. Monomer Material | | | | | |
| Vinyltoluene | 75 | — | 60 | 60 | 78 |
| 4-Vinylpyridine | 5 | 5 | 10 | 10.5 | — |
| Methacrylic acid | — | — | — | 8.5 | 20 |
| Methylmethacrylate | 5 | 10 | — | 10 | 20 |
| Dimethylaminoethylmethacrylate | 5 | 5 | — | 1 | 2 |
| Styrene | — | 70 | 20 | 20 | — |
| 12. Polymerization Initiator | | | | | |
| AZDN[6] | — | — | 3 | 4 | 4 |
| Cumene Hydroperoxide | 3 | 3 | — | — | — |
| 13. Polymerization Conditions | | | | | |
| Time, hours, approx. | 6 | 5 | 5 | 6 | 7 |
| Temperature, °C. | 90 | 80 | 80 | 75 | 90 |
| Conversion, approx. 100% (X) | X | X | X | X | X |
| 14. Intrachromoleucospheruloid Pigment Dispersion yield | 800 | 840 | 800 | 900 | 800 |
| Average Primary Particle Size Diameter (microns) | <4.0 | <4.0 | <4.0 | <4.0 | <4.0 |

Example 15-1-a. This example is prepared exactly as Example 15-1 except that the 30 parts of titanium dioxide are replaced by 20 parts of magnesium oxide.
Example 15-1-b. This example is prepared exactly as Example 15-1 except that the 30 parts of titanium dioxide are replaced by 30 parts of alumina.
Example 15-1-c. This example is prepared exactly as in Example 15-1 except that the 20 parts of silica (Celite 281) are replaced by 20 parts of hydrated aluminum oxide.
Example 15-3-a. This example is prepared exactly as in Example 15-3 except that the 40 parts of titanium dioxide are replaced by 40 parts of antimony oxide.
Example 15-3-b. This example is prepared exactly as in Example 15-3 except that the 40 parts of titanium dioxide are replaced with 40 parts of zinc oxide.
Example 15-5-a. This example is prepared exactly as Example 15-5 except that the 40 parts of titanium dioxide are replaced with 40 parts of zirconium oxide.
*used as wet presscake material
**capable of effecting emulsion polymerization
Celite tradename for Johns-Mansville Company natural silica
Micro-Cel tradename for Johns-Mansville Company calcium silicate
A-Sil-Ate tradename for Freeport Kaolin Company aluminum silicate
Excelopax tradename for NL Industries zirconium silicate
Baroid Macaloid tradename for NL Industries magnesium silicate
Titanox tradename for NL Industries titanium dioxide pigment
Unitane tradename for American Cyanamid Company titanium dioxide pigment
TiPure tradename for DuPont titanium dioxide pigment
[1]octylphenoxy polyethoxy ethanol (70% active)
[2]stearyl dimethyl benzyl ammonium chloride (82% active)
[3]octylphenoxy polyethoxy ethanol (70% active)
[4]sodium salt of a condensed naphthalene sulfonic acid
[5]N-tallow trimethylene diamine (85% active)
[6]azobisisobutyronitrile

TABLE 16

Preparation of Intrachromoleucospheruloid Pigment Composition (parts by weight)

| Example No. 16- | 1 | 2 | 3 | 4 | 5 |
|---|---|---|---|---|---|
| A. Micronizing Step | | | | | |
| 1. Organic Color Pigment Class | Phthalocyanine | Vat | Phthalocyanine | Vat | Azamethine |

TABLE 16-continued

Preparation of Intrachromoleucospheruloid Pigment Composition (parts by weight)

| Example No. 16- | 1 | 2 | 3 | 4 | 5 |
|---|---|---|---|---|---|
| Trade Name | Heliogen Green A | Ponsol Jade Green | Heliogen Blue PG | Indanthrene Red FBBA | Irgazin Red 2 BLT |
| Color Index Name | Green 7 | Green 1 | Blue 15 | Red 10 | Red 180 |
| Color Index Number | 74260 | 59825 | 74160 | 67009 | — |
| Pigment, dry basis | 25* | 20* | 25* | 30* | 25 |
| 2. Inorganic Pigment | | | | | |
| Trade Name | HiSil 233 | HiSil 404 | Cab-O-Sil M5 | Ludox Colloidal Silica | HiSil 233 |
| Pigment, dry basis | 20 | 20 | 20 | 20 | 20 |
| 3. Inorganic Pigment | | | | | |
| Trade Name | Multifex MM | Hydral 705 | Oncor 23A | Zirconium Oxide | Zinc Oxide Pigment White 4 |
| Pigment, dry basis | 30 | 30 | 30 | 30 | 30 |
| 4. Surface Active Agent** Material (Trade Name) | | | | | |
| Triton X305[1] | 20 | — | — | 20 | 20 |
| Triton X400[2] | 20 | — | 4 | — | — |
| Alipal CO433[3] | — | — | 26 | 20 | — |
| Tamol SN[4] | — | — | 2 | 2 | — |
| Duomeen T[5] | — | 20 | — | — | 20 |
| Ammonium Hydroxide 28% | — | — | — | 10 | — |
| Acetic Acid | 10 | 10 | — | — | 10 |
| 5. Water, quantity | 475 | 400 | 393 | 368 | 455 |
| 6. Micronizing Step | | | | | |
| Method | Ball | Ball | Sand | Sand | Ball |
| Time, hours, approx. | 60 | 60 | 48 | 48 | 46 |
| Temperature, °C. | 28 | 28 | 28 | 28 | 28 |
| Average Particle Size, Diameter (microns) of Composite Pigment | <0.02 | <0.02 | <0.1 | <0.2 | <0.2 |
| 7. Separation, Screening (X) | X | X | X | X | X |
| 8. Water, dilution | 200 | 200 | 200 | 200 | 200 |
| 9. Yield Aqueous Pigment Composition (dispersion) | 800 | 700 | 700 | 700 | 800 |
| B. Polymerization Step | | | | | |
| 10. Surface Active Agent** | yield | | | | |
| (a) Quantity, type | 20[1] | 30[5] | 50[3] | 20[3] | 20[1] |
| (b) Quantity, type | 20[2] | — | — | — | 20[5] |
| Water | 50 | 55 | 40 | 70 | 50 |
| Acetic Acid | 10 | 15 | — | — | 10 |
| Ammonium Hydroxide 28% | — | — | 10 | 10 | — |
| 11. Monomer Material | | | | | |
| Styrene | 40 | 20 | 20 | 40 | 30 |
| Methylmethacrylate | — | 50 | 20 | — | 30 |
| Dimethylaminoethylmethacrylate | — | — | 20 | — | — |
| 4-Vinylpyridine | — | — | — | 10 | — |
| Methacrylic Acid | 5 | 5 | — | — | — |
| Acrylic Acid | — | — | — | — | 5 |
| 12. Polymerization Initiator | | | | | |
| AZDN[6] | — | — | 3 | 3 | — |
| Potassium Persulfate | 2.5 | 3 | — | — | 2.5 |
| Sodium Bisulfite | 1.25 | 1.5 | — | — | 1.25 |
| 13. Polymerization Conditions | | | | | |
| Time, hours, approx. | 5 | 6 | 5 | 5 | 6 |
| Temperature, °C. | 65 | 65 | 80 | 80 | 65 |
| Conversion, approx. 100% (X) | X | X | X | X | X |
| 14. Intrachromoleucospheruloid Pigment Dispersion | | | | | |
| Yield | 945 | 875 | 860 | 850 | 965 |
| Average Particle Size Diameter (microns) | <4.0 | <4.0 | <4.0 | <4.0 | <4.0 |

*used as wet presscake material
**capable of effecting emulsion polymerization
HiSil tradename for PPG Industries precipitated silica
Cab-O-Sil tradename for Cabot Corporation pyrogenic silica
Ludox tradename for DuPont colloidal silica
Multifex tradename for Diamond Shamrock Corporation calcium carbonate
Hydral tradename for Alcoa hydrated aluminum oxide
Oncor tradename for NL Industries antimony oxide pigment
[1]octylphenoxy polyethoxy ethanol (70% active)
[2]stearyl dimethyl benzyl ammonium chloride (82% active)
[3]sodium salt of a sulfate ester of an alkylphenoxy poly(ethyleneoxy)ethanol (28% active)
[4]sodium salt of a condensed naphthalene sulfonic acid
[5]N-tallow trimethylene diamine (85% active)
[6]azobisisobutyronitrile

TABLE 17

Preparation of Intrachromoleucospheruloid Pigment Composition
(parts by weight)

| Example No. 17- | 1 | 2 | 3 | 4 | 5 |
|---|---|---|---|---|---|
| A. Micronizing Step | | | | | |
| 1. Organic Color Pigment | | | | | |
| Class | Dioxazine Carbazole | Vat Perylene | Triphenylmethane | Phthalocyanine | Aso |
| Trade Name | Violet R | Red | Victoria Blue | Viridine | Ex. Y Permagan |
| Color Index Name | Violet 23 | Red 29 | Blue 1 | Green 41 | Yellow 14 |
| Color Index Number | 51319 | 71140 | 42595 | 74160 | 21095 |
| Pigment, dry basis | 15* | 30* | 20 | 30 | 35 |
| 2. Inorganic Pigment | | | | | |
| Trade Name | Titanox RA 45 | Unitane OR560 | TiPure LW | TiPure R941 Slurry | TiPure R900 |
| Pigment, dry basis | 25 | 40 | 30 | 40 | 45 |
| 3. Inorganic Pigment | | | | | |
| Trade Name | Silene D | HiSil EP | Excelopax Zirconium Silicate | HiSil 233 | Oncor 23A |
| Pigment, dry basis | 15 | 20 | 15 | 20 | 10 |
| 4. Surface Active Agent** Material, Trade Name | | | | | |
| Triton X405[1] | 100 | — | — | — | — |
| Alipal CO433[2] | — | 20 | — | — | — |
| Tamol 731[3] | — | 15 | — | — | — |
| Monazoline T[4] | 2 | 2 | 10 | — | — |
| SAMV Amphoteric Copolymer[5] | — | — | 40 | — | — |
| SMA Copolymer[6] | — | — | — | 30 | — |
| W-Group polymer[7] | — | — | — | — | 40 |
| Ammonium Hydroxide 28% | 2 | 5 | — | 5 | 5 |
| Acetic Acid | — | — | 5 | — | — |
| 5. Water, Quantity | 341 | 368 | 380 | 375 | 365 |
| 6. Micronizing Step | | | | | |
| Method | Sand | Sand | Sand | Sand | Sand |
| Time, hours, approx. | 48 | 48 | 48 | 48 | 48 |
| Temperature, °C. | 28 | 28 | 28 | 28 | 28 |
| Average Particle Size Diameter (microns) of Composite Pigment | <0.1 | <0.1 | <0.2 | <0.1 | <0.1 |
| 7. Separation, Screening (X) | X | X | X | X | X |
| 8. Water, dilution | 200 | 200 | 200 | 200 | 200 |
| 9. Yield Aqueous Pigment Composition (dispersion) | 700 | 700 | 700 | 700 | 700 |
| B. Polymerization Step | | | | | |
| 10. Surface Active Agent** | | | | | |
| (a) Quantity, type | — | 60[2] | 20[1] | 70[2] | 50[1] |
| (b) Quantity, type | — | — | 20[4] | — | — |
| Water | — | 30 | 25 | 25 | 45 |
| Acetic Acid | — | — | 5 | — | — |
| Ammonium Hydroxide 28% | 5 | 10 | — | 5 | 5 |
| 11. Monomer Material | | | | | |
| Styrene | 50 | 60.9 | 50 | — | — |
| 4-vinylpyridine | 10 | 10.5 | — | — | — |
| Methacrylic Acid | — | 8.6 | — | — | — |
| Acrylonitrile | — | — | 10 | — | — |
| Dimethylaminoethylmethacrylate | — | — | ' | 15 | 15 |
| Methylmethacrylate | — | — | — | 45 | 45 |
| 12. Polymerization Initiator | | | | | |
| AZDN[8] | 2 | 3 | 2 | — | 2 |
| Cumene Hydroperoxide | — | — | — | 3 | — |
| 13. Polymerization Conditions | | | | | |
| Time, hours, approx. | 4 | 5 | 4 | 4 | 4 |
| Temperature, °C. | 80 | 80 | 85 | 80 | 80 |
| Conversion, approx. 100% (X) | X | X | X | X | X |
| 14. Intrachromoleucospheruloid Pigment Dispersion-yield | 765 | 880 | 830 | 860 | 860 |
| Average Particle Size | | | | | |

TABLE 17-continued

Preparation of Intrachromoleucospheruloid Pigment Composition
(parts by weight)

| Example No. 17- | 1 | 2 | 3 | 4 | 5 |
|---|---|---|---|---|---|
| Diameter (microns) | <4.0 | <4.0 | <4.0 | <4.0 | <4.0 |

*used as wet presscake material
**capable of effecting emulsion polymerization
Titanox tradename for National Lead Industries titanium dioxide pigment
Unitane tradename for American Cyanamid titanium dioxide pigment
TiPure tradename for DuPont titanium dioxide pigment
Silene tradename for PPG Industries precipitated silica, calcium modified
HiSil tradename for PPG Industries precipitated silica
Excelopax tradename for National Lead Industries zirconium silicate
Oncor tradename for National Lead Industries antimony oxide/silica pigment
[1] octylphenoxy polyethoxy ethanol (70% active)
[2] sodium salt of a sulfate ester of an alkylphenoxy poly(ethyleneoxy)ethanol (28% active)
[3] sodium salt of a polycarboxylic acid (100% active)
[4] substituted imidazoline of tall oil (100% active)
[5] copolymer of styrene, acrylonitrile, methacrylic acid and 4-vinylpyridine, ratio 25/10/29/36
[6] copolymer of styrene, methacrylic acid and acrylonitrile, ratio 25/65/10
[7] 4-vinylpyridine homopolymer
[8] azobisisobutyronitrile

TABLE 18

Preparation of Intrachromoleucospheruloid Pigment Composition
(parts by weight)

| Example No. 18- | 1 | 2 | 3 | 4 | 5 |
|---|---|---|---|---|---|
| A. Micronizing Step | | | | | |
| 1. Organic Color Pigment | | | | | |
| Class | Dioxazine | Phthalocyanine | Quinacridone | Azo | Vat |
| Trade Name | Irgazon Violet 2BLT | Heliogen Green A | Magenta | Permanent Carmine | Indanthren Blue BC |
| Color Index Name | — | Green 7 | Red 122 | Red 5 | Blue 6 |
| Color Index Number | — | 74260 | — | 12490 | 69825 |
| Pigment, dry basis | 20 | 20* | 30 | 30 | 30* |
| 2. Inorganic Pigment | | | | | |
| Trade Name | HiSil 404 | Excelopax Zirconium Silicate | Micro-Cel T-38 | Cab-O-Sil H5 | HiSil 233 |
| Pigment, dry basis | 20 | 20 | 30 | 25 | 25 |
| 3. Inorganic Pigment | | | | | |
| Trade Name | Oncor 23A | TiPure LW | TiPure R941 Slurry | Aluminum Oxide | TiPure LW |
| Pigment, dry basis | 30 | 30 | 40 | 40 | 40 |
| 4. Surface Active Agent** Material, Trade Name | | | | | |
| Alipal CO433[1] | 40 | — | — | 20 | — |
| Monazoline T[2] | 2 | — | — | 2 | — |
| Zonyl FSH[3] | 1 | — | — | 1 | — |
| Duomeen T[4] | — | 30 | — | — | 30 |
| Monaquat TIBC[5] | — | 10 | 2 | — | 10 |
| Triton X405[6] | — | — | 50 | — | — |
| Ammonium Hydroxide 28% | 10 | — | — | — | — |
| Acetic Acid | — | 15 | — | — | 15 |
| 5. Water, Quantity | 377 | 375 | 348 | 382 | 350 |
| 6. Micronizing Step | | | | | |
| Method | Sand | Ball | Sand | Sand | Ball |
| Time, hours, approx. | 48 | 60 | 48 | 48 | 60 |
| Temperature, °C. | 28 | 28 | 28 | 28 | 28 |
| Average Particle Size Diameter (microns) of Composite Pigment | <0.1 | 0.2–0.1 | 0.2–0.1 | 0.2–0.1 | <0.2 |
| 7. Separation, Screening (X) | X | X | X | X | X |
| 8. Water, dilution | 300 | 200 | 300 | 200 | 200 |
| 9. Yield Aqueous Pigment Composition (dispersion) | 800 | 700 | 800 | 700 | 700 |
| B. Polymerization Step | | | | | |
| 10. Surface Active Agent** | | | | | |
| (a) Quantity, type | 40[1] | 20[5] | 50[6] | 75[6] | 20[6] |
| (b) Quantity, type | 50[6] | — | — | — | — |
| Water | — | 25 | 45 | 20 | 30 |
| Acetic Acid | — | 5 | — | — | — |
| Ammonium Hydroxide 28% | 10 | — | 5 | 5 | — |
| 11. Monomer Material | | | | | |
| Styrene | 50 | — | 40 | — | 30 |
| Cyclohexylmethacrylate | — | 50 | — | 20 | 20 |
| Methylmethacrylate | — | — | — | 20 | 30 |
| Vinyltoluene | — | — | 20 | — | — |
| Dimethylaminoethylmethacrylate | 10 | — | 10 | 10 | — |

TABLE 18-continued

Preparation of Intrachromoleucospheruloid Pigment Composition (parts by weight)

| Example No. 18- | 1 | 2 | 3 | 4 | 5 |
|---|---|---|---|---|---|
| Methacrylic Acid | — | — | — | — | 10 |
| 12. Polymerization Initiator | | | | | |
| AZDN[7] | 2 | — | 3 | 2 | — |
| Cumene Hydroperoxide | — | 2 | — | — | 2 |
| 13. Polymerization Conditions | | | | | |
| Time, hours, approx. | 4 | 4 | 5 | 5 | 6 |
| Temperature, °C. | 80 | 80 | 80 | 80 | 80 |
| Conversion, approx. 100% (X) | X | X | X | X | X |
| 14. Intrachromoleucospheruloid | | | | | |
| Pigment Dispersion-yield | 960 | 800 | 970 | 850 | 840 |
| Average Particle Size | | | | | |
| Diameter (microns) | <4.0 | <4.0 | <4.0 | <4.0 | <4.0 |
| 15. Water, dilution, approx. | 3000 | 3000 | 3000 | 3000 | 3000 |
| 16. Coagulant, additive | a | b | c | d | e |
| Temperature, °C. | 30 | 30 | 30 | 30 | 30 |
| 17. Reaction Temperature, °C. | 80 | 80 | 80 | 80 | 80 |
| 18. Reaction Time, hrs. approx. | 6 | 6 | 6 | 6 | 6 |
| 19. Isolation Method | | | | | |
| Filtration and washing (X) | — | X | X | — | X |
| 20. Product Available as | | | | | |
| Wet Coagulum (X) | — | X | X | — | X |
| 21. Drying Method (x) | | | | | |
| Oven | — | X | X | — | X |
| Spray | X | — | — | X | — |
| 22. Dry Intrachromoleucospheruloid Pigment-yield (approx.) | 154 | 130 | 170 | 203 | 195 |

*used as wet presscake material
**capable of effecting emulsion polymerization
HiSil tradename for PPG Industries precipitated silica
Excelopax tradename for NL Industries zirconium silicate
Micro-Cel tradename for Johns-Mansville calcium silicate
Cab-O-Sil tradename for Cabot Corporation pyrogenic silica
Oncor tradename for NL Industries antimony oxide pigment
TiPure tradename for DuPont titanium dioxide pigment
[1] sodium salt of a sulfate ester of an alkylphenoxy poly(ethyleneoxy)ethanol (28% active)
[2] substituted imidazoline of tall oil (100% active)
[3] fluorochemical surface active agent (100% active)
[4] N-tallow trimethylene diamine (85% active)
[5] substituted imidazoline quaternized with benzyl chloride (100% active)
[6] octylphenoxy polyethoxy ethanol (70% active)
[7] azobisisobutyronitrile
[a] acetic acid
[b] aq. NaOH
[c] hydroxyacetic acid
[d] formic acid
[e] NH$_4$OH

TABLE 19

Preparation of Intrachromoleucospheruloid Pigment Composition (parts by weight)

| Example No. 19- | 1 | | 2 | |
|---|---|---|---|---|
| A. Micronizing Step | | | | |
| 1. Organic Color Pigment | | | | |
| Class | Azamethine | Phthalocyanine | Vat | Triphenylmethane |
| Trade Name | Irgazin Yellow 3 RLT | Heliogen Blue BG | Perylene Red | Permanent Rose T Toner |
| Color Index Name | Yellow 110 | Blue 15 | Red 29 | Red 81 |
| Color Index Number | — | 74160 | 71140 | 45160 |
| Pigment, dry basis | 35 | 5* | 30 | 10 |
| 2. Inorganic Pigment | | | | |
| Trade Name | HiSil 233 | | HiSil 404 | |
| Pigment, dry basis | 30 | | | 30 |
| 3. Inorganic Pigment | Unitane OR220 | | TiPure R | 941 Slurry |
| Pigment, dry basis | 40 | | | 40 |
| 4. Surface Active Agent** | | | | |
| Material, Trade Name | | | | |
| Alipal CO433[1] | 10 | | | 10 |
| Triton X405[2] | 20 | | | 20 |
| Tamol SW[3] | 2 | | | 2 |
| Monazoline T[4] | 3 | | | 3 |
| Ammonium Hydroxide 28% | 5 | | | 5 |
| 5. Water, quantity | 350 | | | 350 |
| 6. Micronizing Step | | | | |
| Method | Sand | | | Sand |
| Time, hours, approx. | 48 | | | 48 |
| Temperature, °C. | 28 | | | 28 |
| Average Particle Size | | | | |

TABLE 19-continued

Preparation of Intrachromoleucospheruloid Pigment Composition (parts by weight)

| Example No. 19- | 1 | 2 |
|---|---|---|
| Diameter (microns) of Composite Pigment | 0.2-0.1 | 0.2-0.1 |
| 7. Separation, Screening (X) | X | X |
| 8. Water, dilution | 300 | 300 |
| 9. Yield Aqueous Pigment Composition (dispersion) | 800 | 800 |
| B. Polymerization Step | | |
| 10. Surface Active Agent** | | |
| (a) Quantity, type | 10[1] | 10[1] |
| (b) Quantity, type | 40[2] | 40[2] |
| Water | 40 | 40 |
| Acetic Acid | — | — |
| Ammonium Hydroxide 28% | 10 | 10 |
| 11. Monomer Material | | |
| Styrene | 40 | — |
| Methylmethacrylate | 20 | 60 |
| Dimethylaminoethylmethacrylate | 10 | 10 |
| Acrylonitrile | 10 | — |
| Cyclohexylmethacrylate | — | 10 |
| 12. Polymerization Initiator | | |
| AZDN[5] | — | 3 |
| Potassium Persulfate | 3.0 | — |
| Sodium Bisulfite | 1.5 | — |
| 13. Polymerization Conditions | | |
| Time, hours, approx. | 6 | 6 |
| Temperature, °C. | 80 | 80 |
| Conversion, approx. 100% (X) | X | X |
| 14. Intrachromoleucospheruloid Pigment Dispersion - yield | 980 | 980 |
| Average Particle Size Diameter (microns) | <4.0 | <4.0 |

*used as wet presscake material
**capable of effecting emulsion polymerization
HiSil tradename for PPG Industries precipitated silica
Unitane tradename for American Cyanamid titanium dioxide pigment
TiPure tradename for DuPont titanium dioxide pigment
[1]sodium salt of a sulfate ester of an alkylphenoxy poly(ethyleneoxy)ethanol (28% active)
[2]octylphenoxy polyethoxy ethanol (70% active)
[3]sodium salt of a condensed naphthalene sulfonic acid
[4]substituted imidazoline of tall oil (100% active)
[5]azobisisobutyronitrile

TABLE 20

Preparation of Intrachromoleucospheruloid Pigment Composition (parts by weight)

| Example No. 20- | 1 | 2 | 3 | 4 | 5 |
|---|---|---|---|---|---|
| A. Micronizing Step | | | | | |
| 1. Organic Color Pigment | | | | | |
| Class | Vat | Quinacridone | Cond.Azo | Azo | Phthalocyanine |
| Trade Name | Brilliant Orange RK | Monastral Red Y | Chromoptal Red BR | Permagen Yellow | Heliogen Blue BG |
| Color Index Name | Orange 7 | Violet 19 | — | Yellow 14 | Blue 15 |
| Color Index Number | 71105 | 46500 | — | 21095 | 74160 |
| Pigment, dry basis | 30* | 25 | 30 | 35 | 30 |
| 2. Inorganic Pigment Trade Name | Paper Grade Silica Wet PP | Reinforcing Grade Wet PP | Aerosel 300 | Reinforcing Grade Silica Wet PP | Paper Grade Silica Wet PP |
| Pigment, dry basis | 60 | 40 | 50 | 60 | 60 |
| 3. Inorganic Pigment Trade Name | — | TiPure R941 Slurry | Unitane 0310 Dispersion | — | — |
| Pigment, dry basis | — | 30 | 30 | — | — |
| 4. Surface Active Agent** Material, Trade Name | | | | | |
| Alipal CO433[1] | — | — | — | 10 | 20 |
| Triton X405[2] | 40 | 40 | 40 | 30 | 20 |
| Monazoline T[3] | — | — | 2 | — | 2 |
| Tetramethylenepentamine | 2 | — | — | — | — |
| Monaquat TIBC[4] | — | 2 | — | 2 | — |
| Ammonium Hydroxide 28% | 2 | 2 | 2 | 2 | 2 |
| 5. Water, quantity | 366 | 361 | 394 | 361 | 366 |
| 6. Micronizing Step Method | Sand | Sand | Sand | Sand | Sand |

TABLE 20-continued

Preparation of Intrachromoleucospheruloid Pigment Composition
(parts by weight)

| Example No. 20- | 1 | 2 | 3 | 4 | 5 |
|---|---|---|---|---|---|
| Time, hours, approx. | 48 | 48 | 48 | 48 | 48 |
| Temperature, °C. | 28 | 28 | 28 | 28 | 28 |
| Average Particle Size Diameter, (microns) of Composite Pigment | <0.1 | <0.2 | <0.2 | <0.1 | <0.1 |
| 7. Separation, Screening (X) | X | X | X | X | X |
| 8. Water, dilution | 300 | 300 | 250 | 300 | 300 |
| 9. Yield Aqueous Pigment Composition (Dispersion) | 800 | 800 | 800 | 800 | 800 |
| B. Polymerization Step | | | | | |
| 10. Surface Active Agent** | | | | | |
| (a) Quantity, type | 20[1] | 20[1] | 20[2] | 20[2] | 20[2] |
| (b) Quantity, type | — | — | — | — | — |
| Water | 70 | 70 | 70 | 70 | 70 |
| Acetic Acid | — | — | — | — | — |
| Ammonium Hydroxide 28% | 10 | 10 | 10 | 10 | 10 |
| 11. Monomer Material | | | | | |
| Styrene | 40 | — | 20 | 40 | 50 |
| Methylmethacrylate | — | 40 | 20 | 10 | — |
| Diethylaminoethylmethacrylate | — | — | — | 10 | 10 |
| 4-Vinylpyridine | 5 | 5 | 5 | — | — |
| Cyclohexylmethacrylate | 15 | 15 | — | — | — |
| Acrylonitrile | — | — | 15 | — | — |
| 12. Polymerization Initiator | | | | | |
| AZDN[5] | 3 | 2 | 3 | 3 | 3 |
| Cumene Hydroperoxide | — | 2 | — | — | 3 |
| 13. Polymerization Conditions | | | | | |
| Time, hours, approx | 6 | 6 | 6 | 6 | 6 |
| Temperature, °C. | 80 | 80 | 80 | 80 | 80 |
| Conversion, approx. 100% (X) | X | X | X | X | X |
| 14. Intrachromoleucospheruloid Pigment Dispersion yield | 960 | 960 | 960 | 960 | 960 |
| Average Particle Size Diameter (microns) | <4.0 | <4.0 | <4.0 | <4.0 | <4.0 |

*used as wet presscake material
**capable of effecting emulsion polymerization
Unitane tradename for American Cyanamid titanium dioxide pigment
TiPure tradename for DuPont titanium dioxide pigment
Aerosil tradename for Degussa Company pyrogenic silica
[1]sodium salt of a sulfate ester of an alkylphenoxy poly(ethyleneoxy)ethanol (28% active)
[2]octylphenoxy polyethoxy ethanol (70% active)
[3]substituted imidazoline of tall oil (100% active)
[4]substituted imidiazoline quaternized with benzyl chloride (100% active)
[5]azobisisobutyronitrile

EXAMPLES A et seq.

Further Detailed Step-wise Procedures for Producing Intrachromoleucospheruloid Pigment Composition in Various Forms The following Examples are given in detailed procedural form to further exemplify this invention.

Example A (Micronizing of organic and inorganic pigment material as separate steps)

Step 1 (Micronizing organic color pigment with acidic monomer material present)

To a sand mill is charged 20 grams (dry basis) of Vat Green 1 (CI 59825 - Ponsol Jade Green Presscake) and 10 grams (dry basis) of Irgazin Yellow 2GLT (Pigment Yellow 109) together with 200 grams of water, 3 grams methacrylic acid, 2 grams Tamol SN (sodium salt of a condensed naphthalene sulfonic acid), 2 grams Duponol ME (sodium lauryl sulfate) 10 grams Alipal CO 433 (sodium salt of a sulfate ester of an alkylphenoxy poly(ethyleneoxy) ethanol 28% active) and sufficient Ottawa sand to grind the charge. The charge is milled until a representative sample under microscopic examination shows essentially no visible particulate organic material and hence has all of its particles below 0.02 micron in diameter. The organic color pigment dispersion is then separated from the grinding medium by screening and washing to yield 600 grams of color pigment dispersion.

Step 2 (Micronizing inorganic pigment material with basic monomer material present)

To a ball mill is charged 50 grams of titanium dioxide pigment (TiPure R900, DuPont), 20 grams of silica pigment (HiSil 233, PPG), 300 grams water, 6 grams dimethylaminoethylmethacrylate, 20 grams Triton X405 (octylphenoxy polyethoxy ethanol, 70% active) and 2 grams Tamol SN (sodium salt of a condensed naphthalene sulfonic acid). The charge is milled until a representative sample under microscopic examination shows essentially all of the inorganic pigment material to be below 0.2 micron in diameter, i.e. titanium dioxide particles of less than 0.1 micron with silica dioxide adhering to said titanium dioxide particles, the said composite particles being essentially all below 0.2 micron in diameter. The inorganic pigment dispersion is separated from the grinding medium by screening and washing to yield 600 grams of inorganic pigment composition dispersion.

Step 3 (Combination "wedding" and polymerization step)

To an emulsion polymerization apparatus equipped with high speed stirring is charged 600 grams of the inorganic pigment dispersion prepared with cationic monomer and nonionic dispersant from step 2. With vigorous agitation, 200 grams of the organic pigment dispersion prepared with anionic monomer and a combination of anionic and nonionic dispersants from step 1 are added so that the anionic component combines with the cationic component thus wedding the organic color pigment to the inorganic pigment without breaking the dispersion. 100 Grams of a 20% aqueous solution of a copolymer of styrene, methacrylic acid and acrylonitrile (ratio 25/65/10, NH$_4$OH salt) are added together with 60 grams of a monomer mixture consisting of 20 grams styrene, 20 grams methylmethacrylate and 20 grams of 50% divinylbenzene and the system is purged with nitrogen. The temperature of the reaction is raised to 45° C. and 2½ grams of cumene hydroperoxide added. The reaction temperature is raised rapidly to 70° C. and held there for 5 hours. On cooling a bright green intrachromoleucospheruloid latex is obtained. Microscopic examination of a representative sample shows it to consist of bright green opaque spheruloids of polymer, cross-linked by virtue of the divinylbenzene used, to essential insolubility in all physical solvents. The product may be used as is for any purpose where such a latex is suitable, as in the coloration of aqueous based printing formulas, water based paint systems etc.

Example B (Soft powdering and drying)

The procedure of Example A is followed with the exception that the bright green latex is diluted with an equal volume of water and acidified to a pH of 5.0 with dilute aqueous acetic acid to coagulate the product. 40 Grams of a 10% solution of di-tertiary-octyl sodium sulfosuccinate in Stoddard Solvent are added and the slurry heated with turbulent agitation to 80° C. and held there for 5 hours. The coagulum is separated by filtration and washing, from the serum and then dried to give the bright green intrachromoleucospheruloid pigment in soft powder form suitable for use in oil based and thermoplastic systems as well as for use in aqueously based systems which are of appropriate refractive index.

Example C (Product substantive to cellulosic materials and glass)

The procedure of Example B is followed with the exception that in the polymerization step, after the addition of the polymeric surface active agent mat erial (copolymer of styrene/methacrylic acid/acrylonitrile), but prior to the addition of the monomer material, is added 20 grams of a water soluble polyethylene PEI 600 (Dow). This yields an intrachromoleucospheruloid pigment composition having polyethylene therein. This composition has increased affinity for cellulosic substrate and glass fibre materials especially when used in printing formulations.

Example D (Sequential polymerization of monomers)

The procedure of Example A is followed with the exception that in the polymerization step the monomer material is sequentially added; the first addition consisting of a mixture of 20 grams of styrene and 15 grams of methylmethacrylate and that after the initial polymerization at 70° C. for 5 hours the reaction is cooled to 45° C. and the cross-linking monomer material consisting of a mixture of 5 grams of methylmethacrylate and 20 grams of 50% divinylbenzene are then added. The reaction is then stirred for 20 minutes to allow this additional monomer material to be absorbed into the non-cross-linked intrachromoleucospheruloids, and then heated to 75°–80° C. and held there for an additional 5 hours to complete the polymerization of said absorbed cross-linking monomer material, thus producing intrachromoleucospheruloid pigment in cross-linked form, suitable for further processing, e.g. soft powder treatment, coagulation and drying.

Other Examples

It was shown e.g. in Example D that the spheruloids of the composition may be produced initially as non-cross-linked particles, and be thereafter cross-linked by absorbing cross-linking monomer thereinto and subjecting the same to further polymerization. It has thus been shown that any of the noncross-linked products exemplified may be prepared in cross-linked form by the concurrent or sequential polymerization therewith of cross-linking monomers.

Since the criteria common to the noncross-linked and cross-linked embodiments of the invention are that the products be insoluble in the vehicle of intended use and have a different refractive index than the latter, it will be apparent from the foregoing that the cross-linking monomers, in the Examples producing cross-linked products, may also be replaced by noncross-linking monomers, where the criteria will be satisfied by the environment of use.

While there have been described herein what are at present considered preferred embodiments of the invention, it will be obvious to those skilled in the art that modifications and changes may be made therein without departing from the essence of the invention. For example, the micronized materials in liquid media may be stored after preparation, especially if they contain adequate emulsifier, such previously prepared micronized dispersions may be blended, preferably under further micronization, to provide in liquid media micronized mixed pigments for the process; the modes of combining, heating and polymerizing the ingredients may be varied dependent upon the volumes of materials being handled in manners known to those skilled in the emulsion polymerization art; etc. It is therefore understood that the exemplary embodiments are illustrative and not restrictive of the invention, the scope of which is defined in the appended claims, and that all modifications that come within the meaning and range of equivalents of the claims are intended to be included therein.

This application is one of the following series of applications:

| Number | Serial Number | Title |
|---|---|---|
| First | 712,257 (now U.S. Pat. No. 4,132,561) | Intrachromospheruloid Pigments and Processes for Producing Same |
| Second | 712,254 (now U.S. Pat. | Intraleucospheruloid Pigments and Processes for Producing Same |

-continued

| Number | Serial Number | Title |
|---|---|---|
| | No. 4,132,564) | |
| Third | 712,255 (now U.S. Pat. No. 4,132,562) | Intrachromospheruloid/Inorganic Pigment Compositions and Processes for Producing Same |
| Fourth | 712,256 (now U.S. Pat. No. 4,152,563) | Intraleucospheruloid/Organic Color Pigment Compositions and Processes for Producing Same |
| Fifth | 712,252 (now U.S. Pat. No. 4,169,737) | Intrachromospheruloid/Intraleucospheruloid Pigment Compositions and Processes for Producing Same |
| Sixth | 712,253 (now U.S. Pat. No. 4,154,691) | Intrachromoleucospheruloid Pigment Compositions and Processes for Producing Same |

All of the cases of this series are herein incorporated by reference. The titles of the respective cases indicate the lines of division between the subjects matter thereof. Thus the product of the first case consists essentially of transparent emulsion polymer particles, preferably cross-linked to insolubility in physical solvents and having primary particles of colloidal size (spheruloids), enhancing the optical properties of still smaller particles of organic color pigment (chromo pigment) embedded within them (intra). The second case, in lieu of the organic color pigment has embedded within its spheruloids inorganic white pigment (leuco pigment) enhanced thereby. The product of the third case is a special combination of intrachromospheruloid pigment affixed to leuco pigment and coloring the light reaching and reflected from the latter. The product of the fourth case is a special combination of intraleucospheruloid having chromo pigment material affixed thereto and illuminating the same. The product of the fifth case is a special combination of intrachromospheruloid and intraleucospheruloid pigments bonded together giving mutually enhanced tinctorial properties. The product of the sixth case differs from the foregoing in that its spheruloids have embedded therein and enhance the tinctorial effects of composite particles of essentially transparent organic color (chromo) and inorganic white (leuco) components wedded to each other.

Also incorporated herein are our copending applications Ser. Nos. 712,213 and 712,160 filed concurrently herewith U.S. Pat. Nos. 4,107,132 and 4,107,126 and respectively entitled "Improved Vinylic Filler Products and Processes for Producing Same" and "Improved Vinylic Filler Pigments and Processes for Producing Same, " which copending applications apply to materials different from those concerned in the above listed series of applications, i.e. non-intrachromo- and non-intraleuco- pigment materials, the applicants' soft powdering techniques constituting parts of certain combinations disclosed and claimed in the present application.

We claim:

1. A process for producing intrachromoleucospheruloid pigment composition for combination with a designated vehicle, which process comprises, in combination:

(I)
(a) providing in liquid medium a composite chromoleuco pigment composition consisting essentially of particles of organic color pigment composition wedded to particles of inorganic leuco pigment composition, said composite pigment composition being dispersed in said medium with the aid of 0–100% by weight of the total of surface active agent material set forth in (c), said composite pigment composition being essentially insoluble in the liquid and having primary particles of an average size less than 0.2 micron in diameter, (b) forming an aqueous emulsion polymerization system consisting essentially of (1) the composition of (a), (2) the balance, if any, of 100% of the total surface active agent material set forth in (c) and (3) monomer material selected in the ratio of said monomer material to said pigment composition lying in the range of 100:1 to 1:20 by weight, said monomer material consisting essentially of ethylenically unsaturated monomer material selected as set forth in step (II), said composite pigment composition containing, based on the inorganic pigment therein, from 0 to an equal weight of pigment bonding agent material and from 0 to an equal weight of nitrogenous material, and (4) emulsion polymerization initiator in an effective amount in the range of 0.2 to 10% by weight of the said monomer material, (c) the ratio of the total of the surface active agent material present after (b) to said composite pigment composition and monomer material lying in the range of 2:1 to 1:40 by weight, and said total of surface active agent material being selected from the class of polymeric and nonpolymeric surface active agents and combinations thereof capable of effecting emulsion polymerization of the selected ethylenically unsaturated monomer material to yield polymer particles with the pigment provided in step (a) imbedded therein (d) effecting emulsion polymerization of the combination formed in (b) under agitation and at sufficient temperatures in the range of 0° to 200° C. for sufficient time in the range of a few minutes to 24 hours to permit the polymerization to proceed far enough to effect from 50 to 100% conversion by weight of said monomer material to produce in aqueous dispersion an intrachromoleucospheruloid pigment composition consisting essentially of spheruloids of organic polymer material having primary particles of an average size not exceeding 4 microns in diameter, and having imbedded therein the still smaller size particles of said composite pigment composition; and (e) recovering said intrachromoleucospheruloid pigment composition;

(II) the monomer material referred to in step (b) being selected, from the class consisting of (i) monomer material containing and polymerizable through a single ethylenically unsaturated group and (ii) monomer material containing and polymerizable through a plurality of ethylenically unsaturated groups, for forming polymer spheruloids of different refractive index from the pigment particles and of different refractive index from the designated vehicle; and (III) said designated vehicle being a non-solvent for said recovered pigment composition and being selected from the class consisting of water-based and oil-based vehicles.

2. A process as claimed in claim 1, in which the ratio in step (c) is selected to produce intrachromoleucospheruloid pigment dispersion in step (d) in the form of a latex.

3. A process according to claim 1, wherein at least one of the organic and inorganic pigment compositions supplied for step (a) is a relatively coarse particulate pigment composition and in step (a) is micronized in the liquid medium with the aid of any surface active agent present therein until said pigment composition has primary particles of an average size less than 0.2 micron in diameter.

4. A process according to claim 1, wherein said organic and inorganic pigment compositions supplied for step (a) are co-micronized in said liquid medium in effecting the wedding of the particles thereof to form said composite pigment composition.

5. A process according to claim 4, wherein the liquid medium provided in step (a) consists essentially of an aqueous solution of from 1% to 10% by weight of the total of surface active agent set forth in (c).

6. A process according to claim 4, wherein the liquid medium provided in step (a) consists essentially of monomer material employed in step (b), and in which the surface active agent material employed in step (b) is dissolved in sufficient water to form the emulsion polymerization system of step (b).

7. A process according to claim 4, wherein the co-micronizing is effected with the aid of at least 2% by weight, based on the inorganic pigment composition therein, of pigment bonding agent material as set forth in step (a).

8. A process according to claim 4, wherein the co-micronizing is effected in aqueous medium containing at least 2% by weight of the monomer material employed in step (b), based on the inorganic pigment composition present.

9. A process according to claim 8, wherein the said 2% by weight of monomer material consists essentially of amine monomer material.

10. A process according to claim 1, in which the surface active agent material employed in (b) comprises polymeric and nonpolymeric surface active agent.

11. A process according to claim 10, in which said polymeric surface active agent has acidic groups at least in part in the form of water soluble salts.

12. A process according to claim 10, in which said polymeric surface active agent has basic groups at least in part in the form of water soluble salts.

13. A process according to claim 10, in which said polymeric surface active agent has both acidic and basic groups at least in part in the form of water soluble salts.

14. A process according to claim 1, wherein step (e) is practiced by coagulating the intrachromoleucospheruloid pigment produced by step (d), and separating serum from the coagulum to provide the intrachromoleucospheruloid pigment composition as wet coagulum.

15. A process according to claim 1, wherein step (e) is practiced by coagulating the intrachromoleucospheruloid pigment produced by step (d), separating serum from the coagulum, and drying the wet coagulum.

16. A process according to claim 1, wherein step (e) is practiced by coagulating the intrachromoleucospheruloid pigment produced by step (d), separating serum from the coagulum, and spray drying the wet coagulum.

17. A process according to claim 1, in which the inorganic pigment composition in step (a) consists essentially of silica pigment composition and titanium dioxide pigment composition in a weight ratio in the range of 1:10 to 10:1.

18. A process according to claim 1, in which the selected inorganic pigment composition consists essentially of siliceous pigment of said groups (1) (ii) and (1) (iii).

19. A process according to claim 1, in which the inorganic pigment composition in step (a) consists essentially of titanium dioxide pigment composition having primary particles of an average size in the range of about 0.2 to 0.1 micron in diameter.

20. A process according to claim 1, in which the inorganic pigment composition in step (a) consists essentially of titanium dioxide pigment composition having primary particles of an average size less than 0.2 micron in diameter.

21. A process according to claim 1, in which
(I) the inorganic pigment composition is selected from the class consisting of the following groups (1) siliceous pigment compositions selected from (i) the natural silica pigments, (ii) the precipitated silica pigments, (iii) the pyrogenic silica pigments, (iv) the alkaline-earth metal silicate pigments, (v) the aluminum silicate pigments, (vi) the zinc silicate pigments, (vii) the zirconium silicate pigments and (viii) combinations of any two or more of the foregoing; (2) titanium dioxide pigment compositions; (3) pigment compositions selected from the class consisting of the following groups (i) alkaline-earth metal carbonate and sulfate pigments, (ii) alumina pigments, (iii) hydrated aluminum oxide pigments, (iv) antimony oxide pigments, (v) zinc oxide pigments, (vi) zirconium oxide pigments and (vii) combinations of any two or more of the foregoing, and (4) combinations of any two or more members selected respectively from groups of (1), (2) and (3);
(II) said pigment bonding agent, when present, is selected from the group consisting of (i) water soluble alkali metal silicates precipitated in the presence of at least a part of the pigment composition, (ii) water soluble titanium compounds precipitated in the presence of at least a part of the pigment composition, (iii) water soluble and dispersible aminoplasts preformed and formed in situ and adhered to at least a part of the pigment composition, (iv) water soluble and dispersible phenoplasts preformed and formed in situ and adhered to at least a part of the pigment composition, (v) water soluble and dispersible organic polymers having carboxyl, amine, sulfate and sulfonic acid groups and salts thereof precipitated in the presence of at least a part of the pigment composition, and (vi) water soluble and dispersible organic silanes adhered to at least a part of the pigment composition; and
(III) said nitrogenous materials when present is selected from the group consisting of (i) oleophilic amines, (ii) oleophilic imines, (iii) oleophilic amine carboxylates, (iv) the oleophilic quaternary ammonium compounds, (v) water soluble polyamines, (vi) water soluble imines, and (vii) combinations of two or more members of the foregoing.

22. An intrachromoleucospheruloid pigment for combination with a designated vehicle consisting essentially of spheruloids of polymerized monomer material selected from the class consisting of the monoethylenically unsaturated and polyethylenically unsaturated polymerizable compounds, said spheruloids having primary particles of an average size not exceeding 4 microns in diameter, which have embedded therein still smaller particles of composite pigment composition, said composite pigment composition comprising, as component particles thereof, organic color pigment material and inorganic leuco pigment material, wedded to each other, the weight ratio of said organic polymer material to said composite pigment composition being in the range of 100:1 to 1:20, the organic color component of said composite pigment material having primary particles of an average size not exceeding 0.2 micron in diameter, the inorganic leuco component of said composite pigment material being selected from the class consisting of the opaque white pigments and the transparent white pigments having refractive indicies different from that of the cross-linked organic polymer of the speruloids and having primary particles of an average size not exceeding 0.2 micron in diameter, and the weight ratio of said organic color compoment to said inorganic leuco component of said composite pigment material being in the range of 100:1 to 1:100 by weight, the polymer material of the spheruloids being of different refractive index from the pigment materials embedded therein and from the designated vehicle, and said designated vehicle being a non-solvent for the polymer of said spheruloids.

23. An intrachromoleucospheruloid pigment according to claim 22, in the form of a latex.

24. An intrachromoleucospheruloid pigment according to claim 22 in the form of a wet coagulum.

25. An intrachromoleucospheruloid pigment according to claim 22, in powder form.

26. An intrachromoleucospheruloid pigment composition according to claim 22, in which the organic component of said composite pigment material consists essentially of silica pigment composition and titanium dioxide pigment composition in a weight ratio in the range of 1:10 to 10:1.

27. An intrachromoleucospheruloid pigment composition according to claim 22, the organic component of said composite pigment composition being selected from the class consisting of the following groups (1) siliceous pigmemt compositions selected from (i) the natural silica pigments, (ii) the precipitated silica pigments, (iii) the pyrogenic silica pigments, (iv) the alkaline earth silicate pigments, (v) the aluminum silicate pigments, (vi) the zinc silicate pigments, (vii) the zirconium silicate pigments, and (viii) combinations of any two or more of the foregoing; (2) titanium dioxide pigment compositions; (3) metal oxide and hydroxide pigment compositions selected from (i) alkaline-earth oxide pigments, (ii) alumina pigments, (iii) aluminum hydroxide pigments, (iv) antimony oxide pigments, (v) zinc oxide pigments, (vi) zirconium oxide pigments, and (vii) combinations of any two or more of the foregoing, and (4) combinations of any two or more members selected respectively from groups (1), (2), and (3); the composite pigment composition thereof containing from 0 to an equal weight of pigment bonding agent material formed in situ in the presence of at least the inorganic component of said pigment compositions, and selected from the class consisting of water insoluble deposits from (i) water soluble alkali metal silicates, (ii) water soluble titanium compounds, (iii) water soluble and dispersible aminoplasts preformed and formed in situ, (iv) water soluble and dispersible phenoplasts performed and formed in situ, (v) water soluble and dispersible organic polymers having carboxyl, amine, sulfate and sulfonic acid groups and salts thereof, and (vi) water soluble and dispersible organic silanes; and the composite pigment composition thereof having from 0 to an equal weight of nitrogenous material therein, said nitrogenous material being selected from the class consisting of (i) oleophilic amines, (ii) oleophilic imines, (iii) oleophilic amine c carboxylates, (iv) the oleophilic quaternary ammonium compounds, (v) water soluble polyamines, (vi) water soluble imines, and (vii) combinations of two or more members of the foregoing.

28. An intrachromoleucospheruloid pigment composition according to claim 27, in which the inorganic component of said composite pigment composition consists essentially of silica pigment composition of the group having primary particles of an average size in the range of 0.2 to 0.01 micron in diameter.

29. An intrachromoleucospheruloid pigment composition according to claim 22 in which the inorganic pigment material consists essentially of titanium dioxide pigment composition having primary particles of an average size of less than 0.2 micron in diameter.

30. An intrachromoleucospheruloid pigment composition according to claim 22, in which the inorganic pigment material consists essentially of titanium dioxide pigment composition having primary particles of an average size in the range of about 0.2 to 0.1 micron in diameter.

31. An intrachromoleucospheruloid pigment material according to claim 22, in which the organic color pigment material embedded in the polymer material consists of an essentially homogeneous mixture of two or more chemically different organic color pigments, said intrachromoleucospheruloid pigment exhibiting a coloration different from that of either of said color pigments.

* * * * *